US008624460B2

(12) United States Patent
Kuhlmann-Wilsdorf

(10) Patent No.: US 8,624,460 B2
(45) Date of Patent: *Jan. 7, 2014

(54) MP-T II MACHINES

(75) Inventors: Doris Kuhlmann-Wilsdorf, Charlottesville, VA (US); Robert J. Kroner, legal representative, Charlottesville, VA (US)

(73) Assignee: Kuhlmann-Wilsdorf Motors, LLC, Charlottesville, VA (US)

( * ) Notice: Subject to any disclaimer, the term of this patent is extended or adjusted under 35 U.S.C. 154(b) by 767 days.

This patent is subject to a terminal disclaimer.

(21) Appl. No.: 12/668,430

(22) PCT Filed: Jul. 13, 2007

(86) PCT No.: PCT/US2007/016035
§ 371 (c)(1),
(2), (4) Date: Sep. 14, 2010

(87) PCT Pub. No.: WO2009/011673
PCT Pub. Date: Jan. 22, 2009

(65) Prior Publication Data
US 2011/0210636 A1 Sep. 1, 2011

(51) Int. Cl.
*H02K 9/00* (2006.01)
*H02K 31/00* (2006.01)
(52) U.S. Cl.
USPC .......... 310/178; 310/52; 310/54; 310/58; 310/59; 310/61; 310/112; 310/114; 310/115
(58) Field of Classification Search
USPC ......... 310/178, 112, 114, 115, 52, 54, 58, 59, 310/61
See application file for complete search history.

(56) References Cited

U.S. PATENT DOCUMENTS

| 4,710,660 | A | | 12/1987 | McKee et al. |
| 4,900,965 | A | * | 2/1990 | Fisher .................... 310/216.006 |
| 5,049,771 | A | | 9/1991 | Challita et al. |
| 5,331,244 | A | * | 7/1994 | Rabe ............................. 310/180 |
| 5,874,881 | A | * | 2/1999 | Steinbusch ..................... 335/222 |
| 6,043,579 | A | | 3/2000 | Hill |
| 6,727,632 | B2 | * | 4/2004 | Kusase .......................... 310/266 |
| 7,246,428 | B2 | * | 7/2007 | Fukasaku et al. ............... 29/605 |
| 7,545,060 | B2 | * | 6/2009 | Ward ............................. 310/54 |
| 7,777,383 | B2 | * | 8/2010 | Wilsdorf ....................... 310/178 |
| 2004/0140725 | A1 | * | 7/2004 | Takahashi ................ 310/156.21 |
| 2011/0210636 | A1 | * | 9/2011 | Kuhlmann-Wilsdorf ..... 310/178 |

FOREIGN PATENT DOCUMENTS

WO WO 2007/024224 A1 3/2007

OTHER PUBLICATIONS

Office Action issued Jun. 29, 2012 in Australian Application No. 2007356497.

(Continued)

*Primary Examiner* — John K Kim
*Assistant Examiner* — Rohit Singh
(74) *Attorney, Agent, or Firm* — Oblon, Spivak, McClelland, Maier & Neustadt, L.L.P.

(57) ABSTRACT

MP-T II Machines are alternating current, two, three, or four or more phase machines of the multipolar type, i.e. machines whose torque is produced in a cylindrical current tube through axially oriented current flow in a plurality of turns between pairs of parallel permanent magnet poles attached to cylindrical concentric magnet tubes. Unlike MP-T machines, MP-T II machines use flat permanent magnets and may contain cooling cuffs as needed.

23 Claims, 12 Drawing Sheets

(56) References Cited

OTHER PUBLICATIONS

Office Action with relevant Articles and Rules of Law cited in the Office Action issued Mar. 16, 2012, in Chinese Patent Application No. 200780100253.4 (submitting English translation only).

Office Action issued Nov. 26, 2012 in Chinese Patent Application No. 200780100253.4 (English translation only).

Japanese Office Action issued Jul. 3, 2012, in Patent Application No. 2010-516955 (English-language translation only).

Office Action issued Aug. 20, 2013, in Korean Patent Application No. 10-2010-7002572 with English translation.

* cited by examiner

MP-T II MACHINES

CROSS-REFERENCES TO RELATED APPLICATIONS

Reference is made to U.S. Provisional Patent Application Ser. No. 60/811,946 filed Jun. 8, 2006, entitled "Multipolar Flat Magnets," and U.S. Provisional Patent Application Ser. No. 60/811,944 filed Jun. 8, 2006, entitled "MP-T Cooling and Lubrication," which are hereby incorporated herein by reference in their entirety.

BACKGROUND AND BRIEF SUMMARY OF THE INVENTION

The present invention introduces MP-T II machines, an improved version of the previously invented MP-T machines (see "MP-A and MP-T Machines, Multipolar Machines for Alternating and Three-Phase Currents," D. Kuhlmann-Wilsdorf, Patent Application PCT/US05/30186 filed 24 Aug. 2005). The improvements are (i) exchange of Halbach or other magnet configurations for "flat" magnets (see Provisional Patent Application "Multipolar Flat Magnets," submitted Jun. 8, 2006), (ii) an improved method of cooling (see Provisional Patent Application "MP-T Cooling and Lubrication," submitted Jun. 8, 2006 and incorporated herein), and constructing the current tube from "triple S-ribbons." Like its predecessors, i.e. MP-T and MP-A machines, also MP-T II machines may be adapted to any desired number of phases, i.e. one phase (for AC), two phases, three phases (for three-phase current), four or more phases. Similarly, also, a single MP-T II machine may be divided into $N_U \geq 2$ essentially independent sub-units that may be operated as motors and/or generators, and by a combination of at least two sub-units as transformers.

The advantages of MP-T II machines include increased power density, reduction of expensive permanent magnet material content resulting in lowered materials cost, and simpler design and therefore expected lower manufacturing costs.

DESCRIPTION

Prior Art

"Multipolar" (MP) machines, i.e. MP motors and generators, are characterized by (i) a generally cylindrical "current tube" centered on a rotation axis, (ii) machine current flowing in "turns" along axially extended, regularly spaced paths in the current tube, which paths are penetrated by radial magnetic flux density, B, due "sources of magnetization," typically of permanent magnets, and (iii) means to let the current execute repeated turns such as to generate machine torque of the same sense of rotation everywhere. Typically, the permanent magnets are mounted on the outer surface of an inner magnet tube that is surrounded by the current tube, and/or on the inner surface of an outer magnet tube that encloses the current tube. MP machines with rotating current tube require electric brushes. In brushless MP machines, the current tube is stationary while the "sources of magnetization" rotate about the axis.

In the previously described MP-A and MP-T machines, as well as in MP-T II machines of the present invention, there are as many mutually insulated current paths as there are phases in the current with which a motor is operated or that a generator provides. Hence there is one current path in any MP-A machine or MP-A sub-unit, three parallel current paths in a three phase MP-T machines or its sub-units, and in general n current paths if n current phases are desired.

We may repeat the previous description in Patent Application PCT/US05/30186 filed 24 Aug. 2005) as follows, including re-numberings as appropriate:

FIGS. 1 and 2 clarify two possible basic geometries of simple cylindrical MP machines, namely (i) with rotating current tube (2) in the gap between stationary inner (5) and outer (6) magnet tubes (FIGS. 1A and 2A), and (ii) of stationary current tube (2) and rotating inner (5) and outer (6) magnet tubes (FIGS. 1B and 2B). In the first case, i.e. in FIG. 1A, current tube 2 is rigidly fastened to machine axle 10, namely via drivers 61, so that in the motor mode it drives the axle rotation, and in the generator mode is driven by the axle. Meanwhile magnet tubes 5 and 6 are centered on the axle via low friction bearings 35 but are mechanically anchored to the surroundings, e.g. the machine base plate 19 via supports 25 in FIG. 1A. In the second case, FIG. 1B, the roles are reversed. Now magnet tubes 5 and 6 are rigidly joined to axle 10 via parts 29 and 180 to drive axle 10 or be driven by it, in the motor and generator modes, respectively. Now current tube 2 is centered on, but does not rotate with, axle 10, namely via parts 181 and low friction bearings 35. As indicated by the different power sources, i.e. DC in FIG. 1A and AC in FIGS. 1B and 2, current flows through the current tube, as is the case for all MP-machines, and therefore, in the cases of FIGS. 1A and 2A, has to be supplied to moving current tube 2 by brushes 27(n). However, to a stationary current tube, as in FIG. 2B, current may be supplied by means of stationary terminals in the motor mode, or power may be extracted from MP-T generators through the same stationary terminals.

It may be noted that a central axle may not be needed and that anchoring to any other part of stationary surroundings of machines may be used to center rotating components, albeit probably not as satisfactorily. Anyway, from the mechanical viewpoint, either the current tube or the magnet tubes may rotate with or without a machine axle. The following are some pertinent general considerations.

Simple MP machines have rotationally symmetric current tubes as well as rotationally symmetric magnet tubes. The asymmetry imposed by stationary terminals to outside power supplies and/or customers is readily accommodated by rotating current tubes, the currents in which are fed to and/or extracted from the current tube by means of electrical brushes. Also MP-Plus machines have rotationally symmetric current tubes but they do have asymmetric magnet tubes. These are pairs of N/S S/N poles side by side, relative to which the power terminals have to remain stationary. This situation, again, calls for rotating current tubes connected to the outside by means of sliding brushes. However, MP-A and MP-T machines have rotationally symmetrical magnet tubes but current tubes with built-in asymmetry, namely S-ribbons or S-ribbon sections with ends projecting beyond the zones. This situation permits both, rotating current tubes and rotating magnet tubes, as shown in FIGS. 2A and 2B. However, while the interconnections between rotating current tubes and stationary power supplies and/or customers again require sliding electrical brushes, as in FIG. 2A, stationary slip rings as in FIG. 2B can be supplied by means of stationary terminals, thereby eliminating slip rings and brushes.

In summary, the fundamental difference between MP and MP-Plus machines on the one hand, and MP-A and MP-T machines on the other hand, lies in the morphology of the current tube (2). The current tubes of MP and MP-Plus machines are rotationally symmetrical, as already indicated, whereas the current tubes of MP-A machines comprise at least one conductive S-ribbon 172 in an electrically insulating matrix (see FIG. 2), and the current tubes of MP-T machines contain three similar, regularly spaced S-ribbons in any one series of consecutive zones (see FIG. 3) each with two terminals for feeding current in and out.

In the cited patent application, the geometry of S-ribbons and the practical construction of current tubes as well as the needed 180° S-ribbon turns outside of the current tube was described in several figures beginning with the (re-numbered) FIG. 3 below. The possible magnet arrangements shown in (renumbered) FIG. 4 were discussed as follows:

Possible Arrangements of the Sources of Magnetization in the Magnet Tubes

As already indicated, the arrangement of the sources of magnetization in the magnet tubes, that generate zones in the [current tube] is optional, as indeed is their nature. Above, the discussion has centered on permanent magnets as the sources of magnetization although it could also be electromagnets, and among these Hallbach arrangements as in FIG. [4A] have been the focus of attention. However, a wide range of alternative arrangements is possible of which examples are given in FIGS. [4]B, [4]C and [4]D, wherein 130, with a dotted pattern, is a non-magnetic material such as a plastic, a rosin or a ceramic, 131, indicated by short wavy lines, is a flux return material, e.g. a magnetically soft iron alloy such as FeSi. Finally, 132, characterized by longer lines, is a permanent magnet material.

DETAILED DESCRIPTION OF THE INVENTION

Description of New Features—1. Improved Magnet Arrangements

A not yet completed investigation of various magnet arrangements for MP machines by Prof. Eric H. Maslen, University of Virginia, Charlottesville, Va., using finite element analysis, has shown "flat" magnets to be superior to Halbach arrangements, and it seems likely that flat magnets can also be superior to all other arrangements shown in FIG. 4. The general morphology of "flat" magnets is shown in FIG. 5, while Table II lists the various cases that have so far been studied. Among these, Case 1A and Case 3A are of special significance for the present invention; Case 3A because among all magnet morphologies so far studied achieves the highest power density of MP-T II machines and therefore has been used in the numerical examples below, and Case 1A for comparison purposes since it is distinctly superior to Halbach arrangements but falls short of Case 3A.

Figure 6:
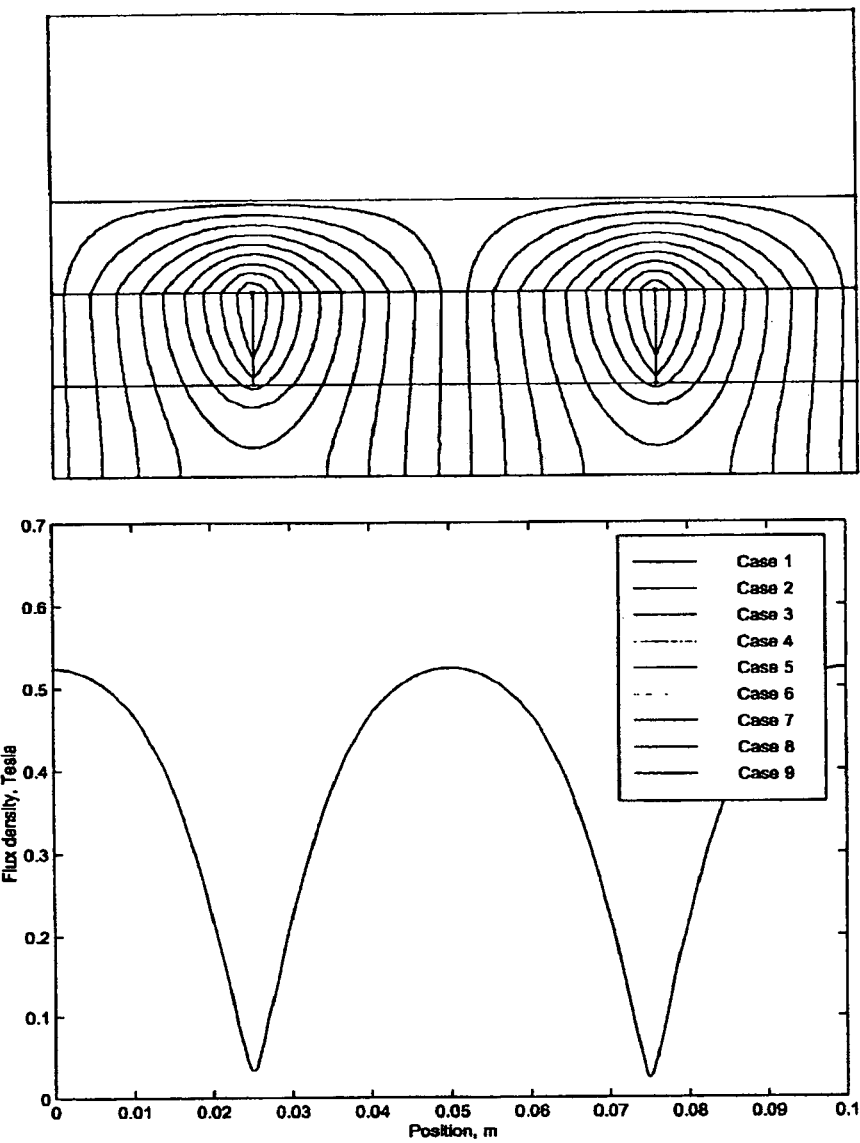
FIG. 6: Morphology of magnets and field lines (as in FIG. 5, top) and magnetic flux density on mid-line of current conduction, torque-producing sections 2(n) (bottom) for Case 1A.
Figure 7:
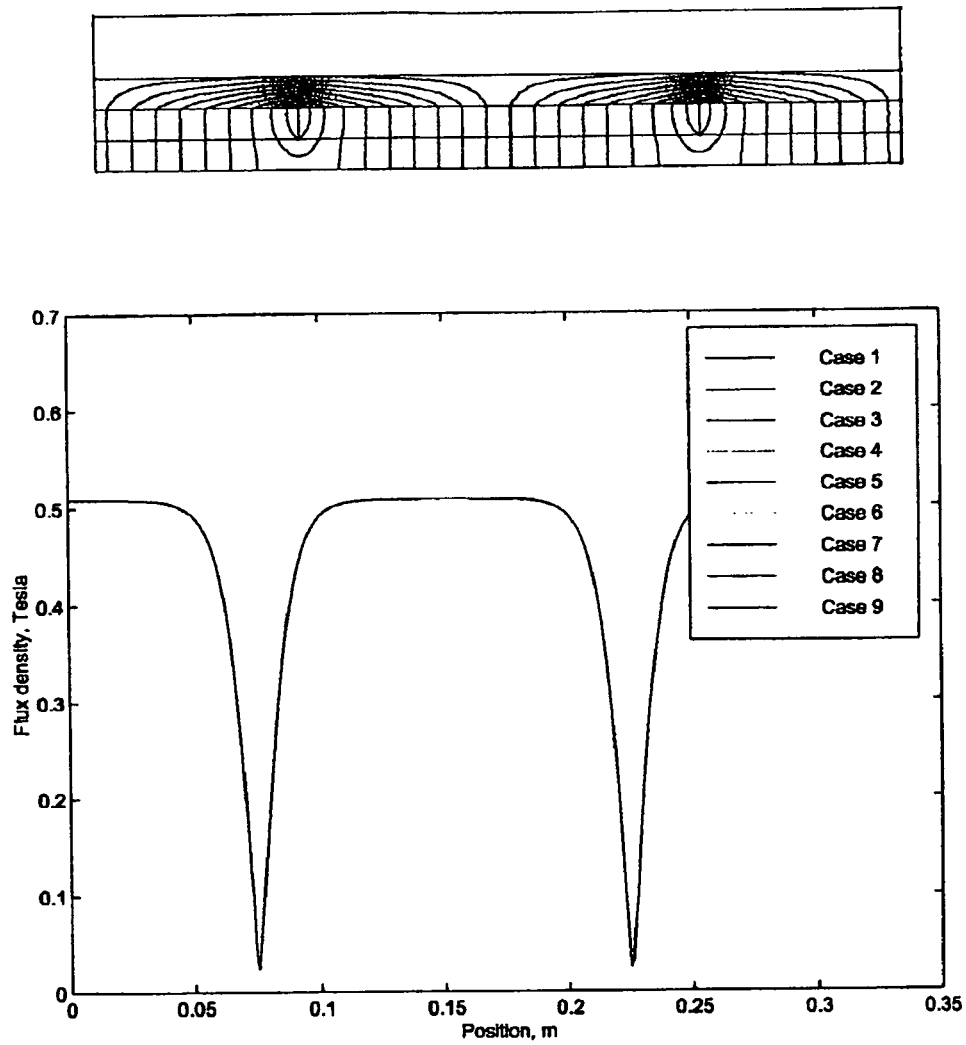
FIG. 7: Morphology of magnets and field lines (as in FIG. 5, top) and magnetic flux density on mid-line of current conduction, torque-producing sections 2(n) (bottom) for Case 3A.

In the numerical examples, 45 MGOe magnet material is assumed, instead of 35 MGOe material in the modeling of FIGS. 6 and 7. This will increase the flux densities B by factor $(45/35)^{1/2}=1.13$. Namely, the power densities of available commercial electric motors and generators tend to be limited through cooling. In these, therefore, 35 MGOe magnet material is used because it can tolerate higher temperatures before losing magnetization than 45 MGOe material. However, MP-T II machines are unlikely to be limited by cooling. Therefore use of 45 MGOe material is appropriate, especially since its price is much the same as that of 35 MGOe material.

Description of New Features—2. Simplified MP-T II Current Tube Construction

The various relevant figures in the patent application "MP-A and MP-T Machines . . . " (PCT/US05/30186 filed Aug. 24, 2005) reveal considerable complexity of the current tube construction, including "rims" that comprise the 180° turns of the S-ribbons at both ends of the current tube shown in FIG. 3. The following description and FIG. 8 present a greatly simplified construction for three-phase MP-T II machines with Case3A magnet morphology as follows:

By the use of Case 3A, the wall width, $T=KT_o=2KH_{mo}=K0.025$ m, is three times smaller than the circumferential magnet length $L_{mi}=K L_{m/o}=K\ 0.075$ m (compare Table II), and typically (as in the examples herein) MP-T II machines comprise three phases. Therefore the current path for any one phase is favorably equiaxed, of breadth and height $2H_m$. Further, for suppression of eddy currents, the individual S-cables for any one phase are favorably made of lightly twisted, mutually insulated Litz cables that have been compacted into (nearly) quadratic cross section, i.e. of edge length ff$2H_m$, and three of these compacted Litz wire cables may be favorably fused (glued) together into a continuous "Triple S-Ribbon" (173) of $2H_m$ thickness and $6H_m=1\ L_m$ width, as indicated in FIG. 8. The optional twist in the individual S-ribbons is meant to prevent the current from crowding towards areas of low flux density, B. For this purpose one full twist per turn will be enough and more twists may be used for other reasons, e.g. greater conductor density or greater stiffness. In current rotor wall, triple S-ribbons are joined at insulating boundaries 174($n$).

Figure 8A:
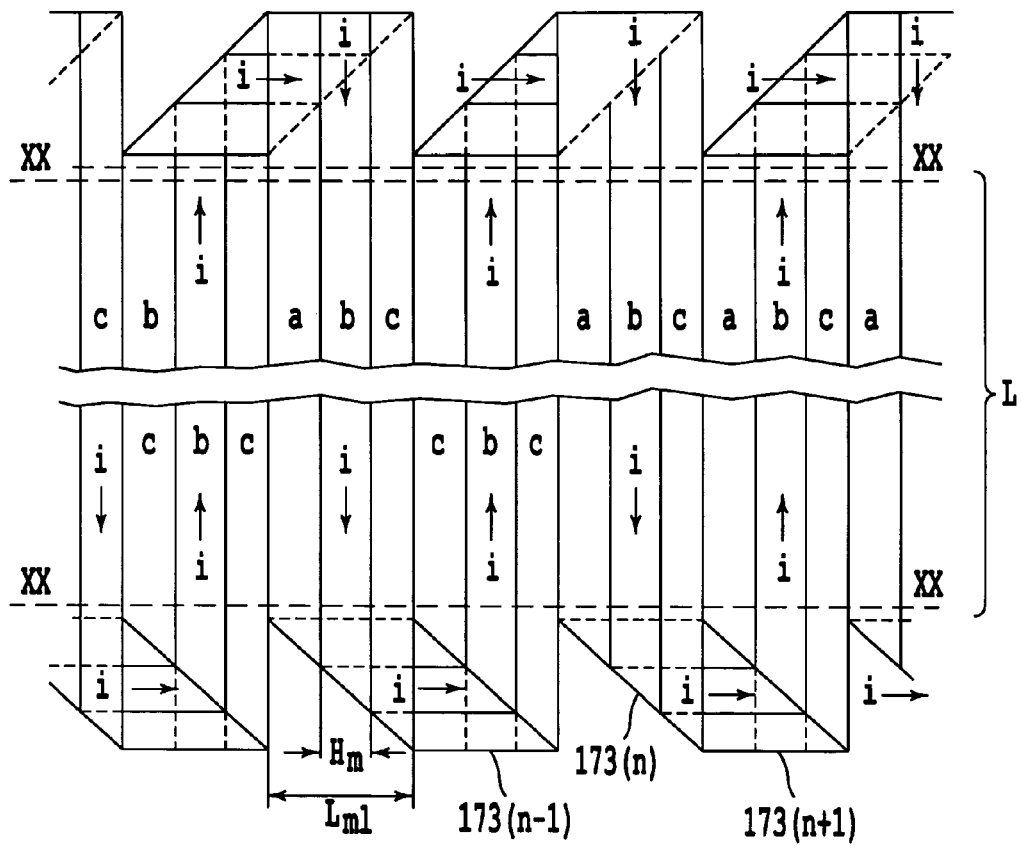
FIG. 8A: Plan view of triple S-ribbons.
Figure 8B:
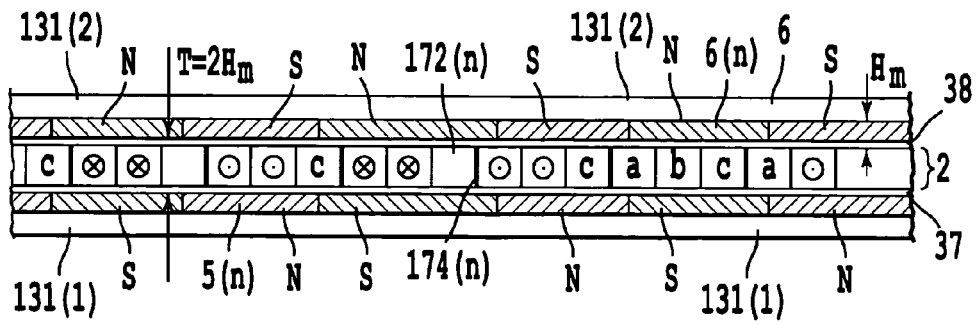
FIG. 8B: Cross section of current tube wall to show Triple S-Ribbons in relation to magnets.
Figure 8C:
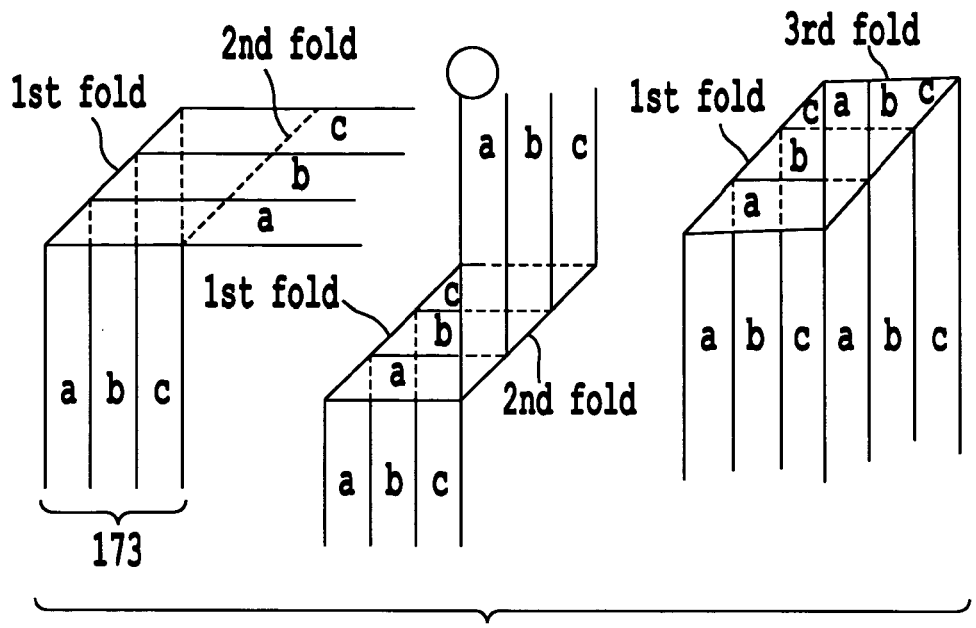
FIG. 8C: Schematic of folds and folding on triple S-ribbons to form 180° turns the preserves order of phases (a), (b) and (c).
Figure 8D:
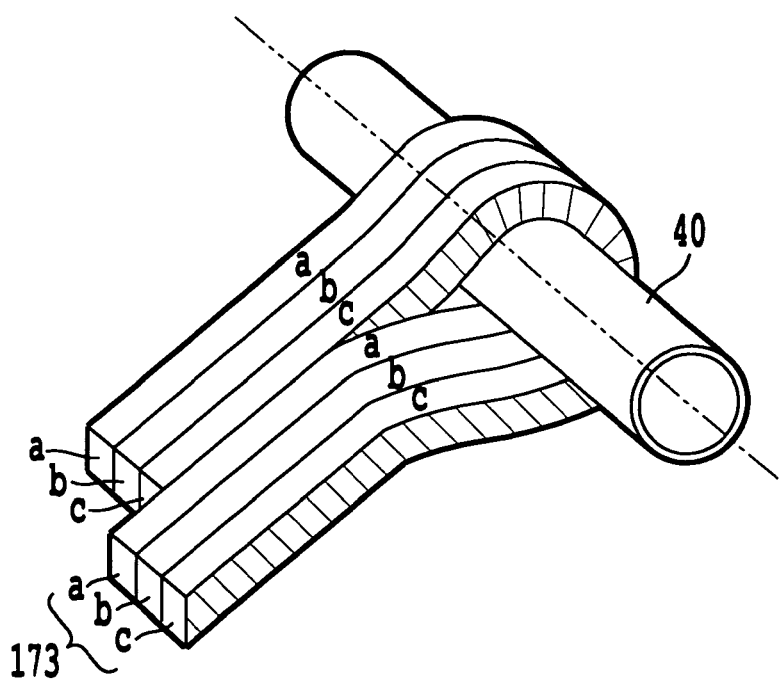
FIG. 8D: Perspective view of "Wrap" for making an 180° S-band turn.

The folding and wrapping described in FIGS. 8C and 8D will be much simpler methods for making the needed 180° turns of the triple S-ribbons than the methods proposed in the earlier patent application. Also, with well made, accurately dimensioned triple S-ribbons, either folding or wrapping should readily permit achieving the requisite accuracy of magnet/S-ribbon alignment in the current tube wall, namely in the current tube wall by bonding them together in good alignment at insulating boundaries (174) of controlled thickness. Good dimensional accuracy of the triple S-ribbons will be necessary also for achieving close roundness of the current tube at its inside and outside surface, so as not to encounter undue friction and/or wear relative to the magnet tubes. Presumably one will assemble current tube segments of, say, 30°, 45°, 60°, 90° or 180° which are then assembled into complete current tubes.

The folds illustrated in FIG. 8C need not be sharp. In fact, it will be difficult if not impossible to make sharp folds of twisted Litz wire cables without introducing cracks or at the least impairing their electrical conductivity. The "wrapping" of FIG. 8D avoids this problem. Both methods are possible because the indicated method of making and assembling current tubes from axially extended segments does not put significant constraints on current tube rim thickness, i.e. outside of the gap between magnet tubes 5 and 6, i.e. either side of lines XX in FIG. 8. In fact, advantageously, the folds of FIG. 8C may be made by bending about cylindrical temporary inserts.

As may be recognized from FIG. 8C, in making 180° turns by means of folding there is a choice whether successive folds are made into or out of the plane of the drawing. The version of FIG. 8C is the simplest. The "rim" formed by the folded or wrapped 180° turns will at least be $L_m=6H_m$ wide but is should best begin a small distance outside of the magnet tubes on both ends, namely to keep them out of stray magnet fields, .e.g. via annular "magnet shields" (90). The width of rims due to wrapping will probably be of similar or lesser width.

Making the 180° turns through wrapping as clarified in FIG. 8D is presumably the simplest and most gentle on the triple S-ribbons. It has the additional advantage that it provides a very simple method of providing "cuff" cooling as further discussed in the next section.

Description of New Features—3. Simplified Cooling and Lubrication

Motivation

In previous patent applications and invention disclosures on MP machines, it has been routinely assumed that coolant would circulate in the spaces between the magnets in the two magnet tubes, and the current tube. In this approach coolant could be fed through those gaps or the whole machine, perhaps with the exception of the two "rims" that, could be immersed in cooling fluid. Such methods appeared to be attractive because of (1) the anticipated efficient cooling and (2) the simultaneous incidental lubrication between the current tube wall and the magnets on both sides. However, it has been pointed out that the resulting fluid friction could significantly subtract from the machine torque, especially at high relative surface speeds. Also, by the use of bundled Litz wires the transverse heat conductivity in the current tube wall could be poor, so as to diminish the expected cooling efficiency of this method. For both of these reasons, alternative cooling methods have been sought. The herein disclosed inventions of (1) "cooling cuffs," namely fluid cooling tubing that encircle one or both current tube rims from the outside and/or the inside and are in close thermal contact with them, and (2) "cooling channels" embedded into current tube walls, provide attractive alternatives for MP machines with stationary current tubes.

Cuff Morphology

Figure 9:
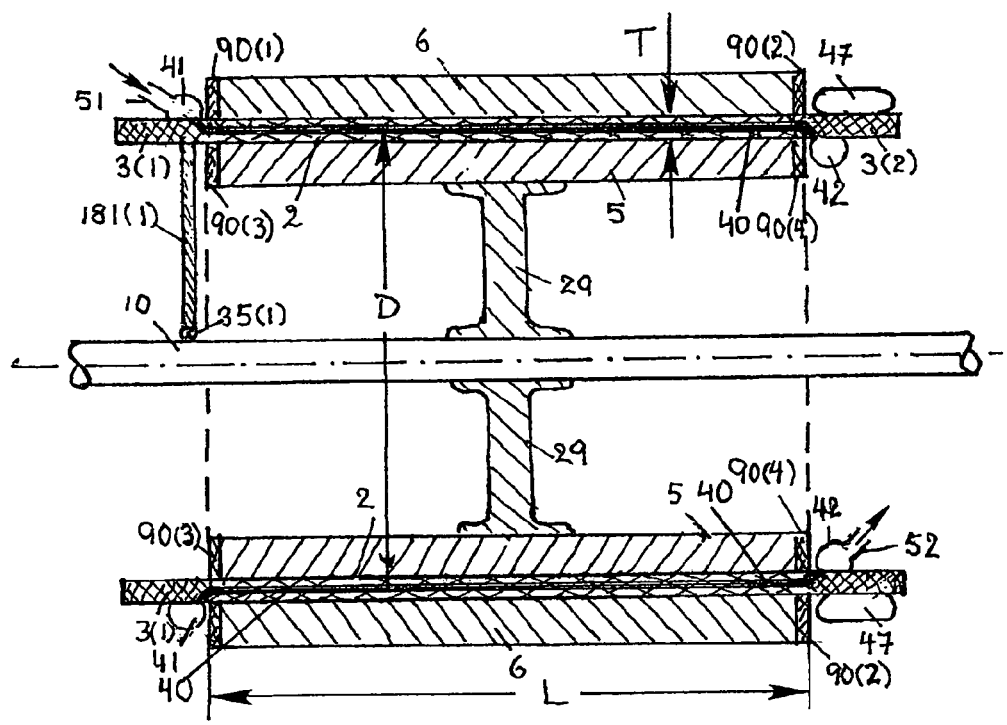
FIG. 9: Lengthwise cross section through a brushless MP machine with stationary current tube, including provision for two possible alternative cooling arrangements.

FIG. 9 shows the basic machine morphology, including provision for two cooling methods. The first, simplest, are "cooling cuffs" (47) that surround one or both rims (3) or are incorporated into the hollows of 180° "wraps" as in FIG. 8D. For optimum heat conduction between rims (3) and the cooling fluid in cuffs (47) or channel 4 in FIG. 8D, the bonding area between the triple S-ribbons in the rim and the cuff(s), as well as the heat conductivity between S-ribbons and cuff(s) should be optimized. For this reason, in the case of folded 180° turns of triple S-ribbons, the triangular notches between neighboring rim units (i.e. at the horizontal edges of FIG. 8A) as well as the thickness differences at the folds should preferably be filled-in with some heat conducting material. For electrical insulation, in case the discussed heat conducting material is also electrically conductive, the rim(s) will need first to be covered with an insulating coating. For wrapped 180° turns, the space inside the "wraps," could readily accommodate a cooling tube (labeled 40 in FIG. 8D) that serves as a "cuff." Such a tube might be bonded to the triple S-ribbons by means of a thin layer of insulating adhesive.

In the case of folded 180° turns, cuffs may also be installed at the inside cylindrical surface. And both types of cuffs may be installed at both tube ends, as may be needed at any but very squat machines, i.e. at quite short current tube lengths, L.

Limits on Current Density in the Current Tube

Current Tubes at Ambient Temperature

Figure 10:
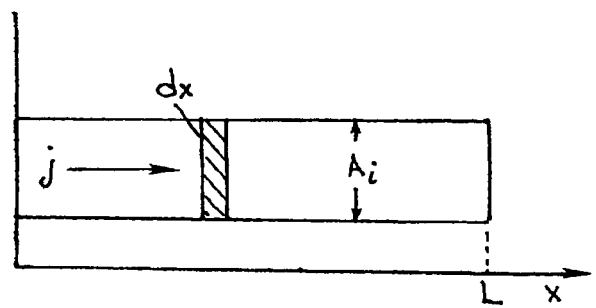
FIG. 10: Model for the derivation of cooling equations 1Q to 15Q.

For the following simplified analysis of cooling by means of cuffs, refer to the schematic representation of FIG. 10. It indicates current density j flowing through length interval dx in a conductor of length L, cross section $A_i$, and electrical resistivity $\rho$ that generates heat at rate $$dQ/dt = j^2 A_i \rho dx \qquad (1Q)$$

which shall be removed by heat conduction to a heat sink at x=L (not shown in FIG. 10).

With d$\theta$ the temperature difference between the location of dx and the heat sink, and $\lambda$ the heat conductivity, such cooling requires $$dQ/dt = \lambda A_i d\theta/L. \qquad (2Q)$$

Thus from equating eqs. 1Q and 2Q, we obtain d$\theta$/dx=$j^2\rho$(L−x)/$\lambda$ or for the temperature difference between x=0 and x=L $$\Delta\theta = \int_0^L j^2\rho(L-x)/\lambda = j^2\rho L^2/2\lambda \qquad (3Q)$$

With an upper limit on the temperature difference between the two ends of, say, $\Delta\theta_{max}$ (as in practice will always be present), the maximum allowable current density then becomes $$j_{max}=(2\lambda\Delta\theta_{max}/\rho L^2)^{1/2}. \tag{4Qa}$$

Numerically, for copper Litz wires bonded by an electrically insulating adhesive that occupies, say, 20% of the volume, the relevant parameters for current and heat flow in axial direction are at room temperature $\rho \cong 2.0 \times 10^{-8}$ $\Omega$m and $\lambda = 320$ w/° Cm, i.e.

$$(\lambda/\rho)_{Litz}=1.6\times10^{10}[w/°\text{ C.}\Omega m^2]=1.6\times10^{10}[A^{2/°}\text{ C.m}^2] \tag{5Qa}$$

and from eq. 4Qa $$j_{max,Litz}=(2\times1.6\times10^{10}\Delta\theta_{max}/L^2)^{1/2}=1.79\times10^5(\Delta\theta_{max}/L^2)^{1/2}. \tag{6Q}$$

A numerical example of potential technological application of eq. 6Q is that of pancake-shaped in-wheel motors for hybrid cars or other wheeled or tracked vehicles. The most extreme construction and use herein required $j_{max/Litz}=2.25\times10^7$ A/m² with L=0.055m, which current density is in fact probably outside of the limit for stable Case 3A magnet configurations. If that current density is adopted non-the-less, eq. 6Q yields $$\Delta\theta_{max}=(2.25\times10^7/1.79\times10^5)^2 0.055^2[\text{mks}]=48°\text{ C.} \tag{7Q}$$

This value of $\Delta\theta_{max}=48°$ C. would be acceptable, as it would not degrade the magnets (at about 150° C.), even with a cuff at only one end and the heat sink end at an ambient temperature as high as, say, 70° C., whereas cuffs at both ends would halve L and thus cut $\Delta\theta_{max}$ to ¼ 48° C.=12° C.

At ambient temperature, cooling through cuffs is restricted to short machines. This is seen from rewriting eq. 4Qa as $$L_{max}=(2\lambda\Delta\theta_{max}/\tau)^{1/2}/j \tag{4Qb}$$

which for a desirable current density of $j=1\times10^7$ A/m² and with otherwise the same values yields $$L_{max}=(2\lambda\Delta\theta_{max}/\rho)^{1/2}/j=0.0179\sqrt{\Delta\theta_{max}}[\text{mks}]. \tag{4Qc}$$

Since without cryogenic cooling, numerically $\Delta\theta_{max}$ can hardly exceed 64° C. or $\sqrt{\Delta\theta_{max}} \le \sim 8(°$ C.$^{1/2})$ this means that for machines that are not cooled cryogenically, the longest distance to the nearest cuff may not exceed $\sim 8\times 0.0179=0.14$ m, for a maximum zone length of $L_{max}\cong 1$ ft of a machine cooled by cuffs at both ends.

Figure 12:
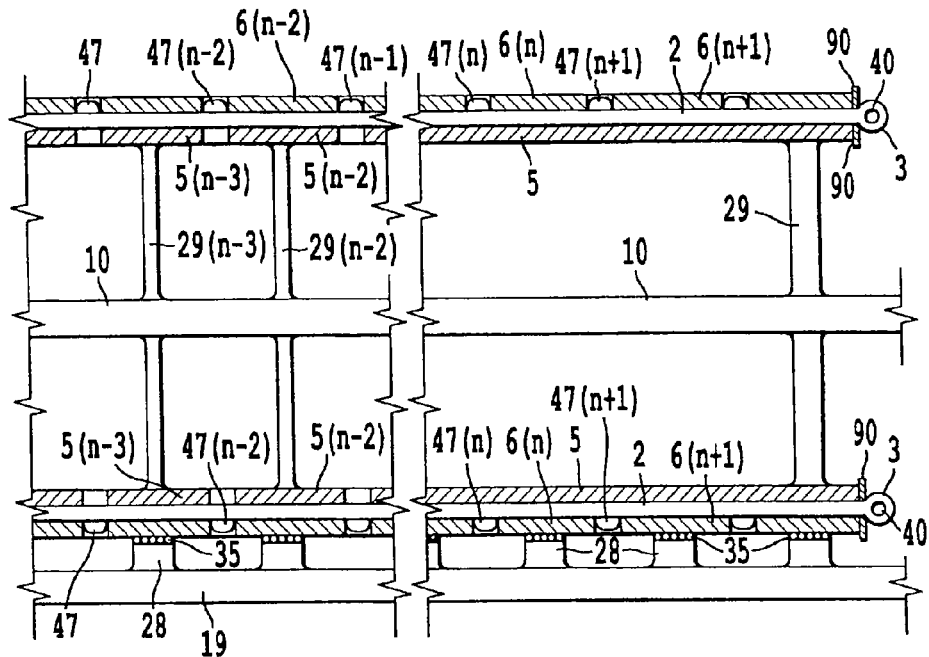
FIG. 12: Schematic of machine with spaced cooling cuffs.

The above result opens the possibility of spacing cuffs along machines at, say, 1 ft intervals. For MP-T II machines this is readily possible, namely by providing the corresponding gaps in the outer (and if desired also the inner) magnet tube as shown in FIG. 12. However, the optimal spacing will have to be determined by a careful analysis, including knowledge of the radial heat conductivity across Litz wire bundles. The 1-foot spacing between cuffs deduced from the above approximate analysis leading to eq. 7Q may be a moderate over-estimate but also could be unduly restrictive.

Cryogenically Cooled Current Tubes with Cuffs

Cryogenic cooling can significantly extend the length limits of machines that may be cooled by cuffs because the electrical resistivity of metals, $\rho$, is roughly proportional to the absolute temperature, $\theta$, while their heat conductivity, $\lambda$, is almost temperature independent. As a result (in accordance with the Wiedemann-Franz law) $\lambda/\rho$ is inversely proportional to the absolute temperature, i.e. we may write (with 300K ambient temperature)

$$(\lambda/\rho)_{Litz}=1.6\times10^{10}(300/\theta)[A^{2/°}\text{ Cm}^2]=4.8\times10^{12}[A^{2/°}\text{ Cm}^2] \tag{5Qb}$$

and for the maximum distance to a cuff with otherwise the identical parameters, $$L_{max,\theta}=L_{max,amb}(300/\theta)^{1/2}. \tag{4Qd}$$

Hence the critical machine length for cooling with cuffs on the current tube rims will be roughly doubled, quadrupled and increased tenfold, at liquid air, hydrogen and helium temperatures, respectively. In the last case, i.e. effective cooling with liquid helium, not only could most realistic machine lengths be cuff-cooled, but the ohmic machine loss will have plummeted to just a few percent of its room temperature value. Additionally to this advantage of the use of cryogenic cooling of the current tube, at low temperatures heat exchange through radiation, e.g. as that between magnets and current tube, will be reduced. On the other hand, differential thermal expansion among the machine parts, and in particular the current tube and magnet tubes, will be a problem. Certainly a more detailed analysis will be needed to decide the merits.

Requirements for Cuffs

Next, for the cases in which cuffs are feasible, it needs to be examined how long they should be and what other characteristics, if any, they should require.

To begin with, at temperature difference $\Delta\theta_c$, heat will pass through a barrier of width $t_c$ made of material having heat conductivity $\lambda_c$ and area $A_c$ at rate $$dQ/dt=(\lambda_c A_c/t_c)\Delta\theta_c \tag{8Q}$$

For a cuff of axial length $w_c$ encircling the rim of a current tube of diameter D, it will be $$A_c=f_c\pi Dw_c \cong \frac{3}{4}\pi Dw_c \tag{9Q}$$

where the factor of $f_c$ is the fraction of rim or current tube circumference that is in good thermal contact with the cuff(s). Provisionally this is assumed to be $f_c \cong \frac{3}{4}$ in line with FIG. 8 and the discussion at the end of section "Morphology." Further, the cooling fluid circulating through the cuff shall transport away the machine waste heat of $dQ/dt = \mathcal{L} W_M$ with $\mathcal{L}$ the fractional ohmic heat loss and $W_M$ the machine power. Thus it shall be $$\mathcal{L} W_M=(\lambda_c \cdot \frac{3}{4}\pi Dw_c/t_c)\Delta\theta_c \tag{10Qa}$$

which relationship determines the required value of $\lambda_c w_c \Delta\theta_c/t_c$. Now, numerically (consistently in mks units) the heat conductivity of a well chosen adhesive and material for the thin barrier between the cuff and the rim, will presumably be no less than $\lambda_c=1.7$ w/° Cm as for ice and concrete; and the barrier thickness may be made as small as $t_c \cong 3\times10^{-5}$ m, i.e. the thickness of a strong kitchen trash bag. With these values, and assuming a permissible value of $\Delta\theta_c=50°$ C., one obtains from eq. 10Qa $$\mathcal{L} W_M=(1.7\times\frac{3}{4}\pi Dw_c/3\times10^{-5})\times 50 \text{ [mks]}=6.7\times10^6 Dw_c \text{ [mks]}. \tag{10Qb}$$

As an example, return to the in-wheel MP-motors already considered. Herein the most demanding case was $W_M=56$ kW and $\mathcal{L}=9.3\%$ for D=0.32 m. For this example, then, the required axial cuff width is found as $$w_c=0.093\times5.6\times10^4/\{0.32\times6.7\times10^6 D\}=0.76 \text{ cm.} \tag{10Qc}$$

It follows that as far as transfer of the heat from the outermost rim layer into the cooling fluid in the cuff is concerned, a very narrow cuff will suffice. However, the example pertained to an $N_T=4$ layered machine and one must additionally consider the heat flow resistance of the three adhesive layers in the rim. If these should offer the same heat flow resistance as the surface bond between cuff and current tube rim, the needed cuff width would be quadrupled, i.e. to about 3 cm, but only by half as much if a cuff is added also on the inside surface of the rim.

In summary, better knowledge of the input parameters, in particular $\lambda_C$ and $t_C$ is needed before more reliable predictions may be made. At any rate, the present rough assessment indicates, firstly, that for short machines cuffs will be very effective and need not be unduly wide, and that regularly spaced cuffs, in the manner of FIGS. 13A and 13B, could make excellent cooling systems.

Figure 11:
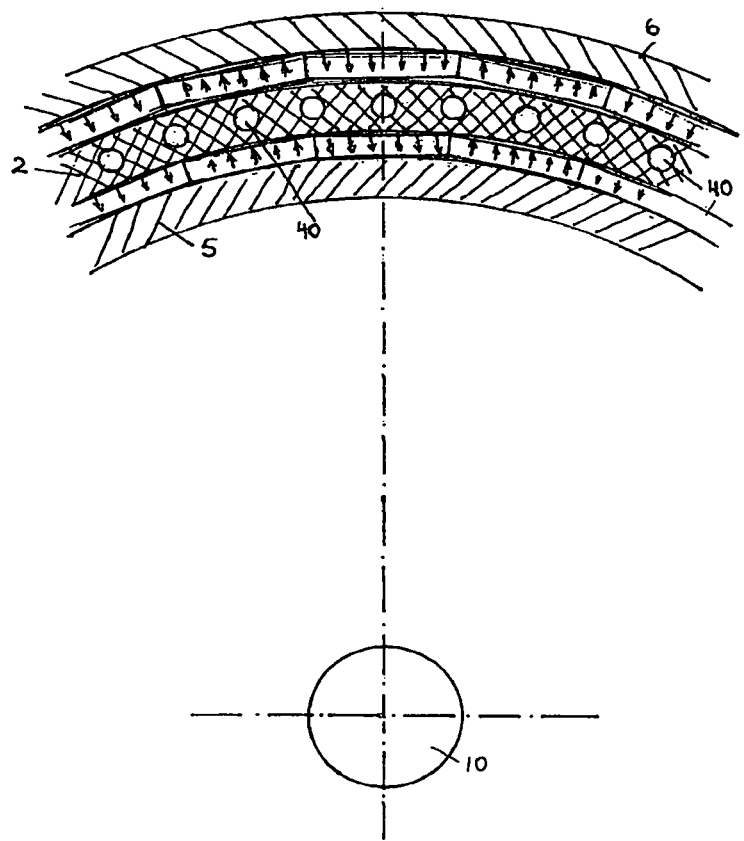
FIG. 11: Cross section through an MP-T machine with flat magnets in the outer (6) and inner (5) magnet tubes, and with cooling channels (40) in the current tube wall (2).

Lubrication and Cooling Channels in Current Tube Walls in Conjunction with Flat Magnets According to the section "Description of New Features—1. Improved Magnet Arrangements" above, MP-T II machines will preferably employ "flat" magnets of Case 3A as indicated in FIG. 7. Besides increasing the power density and reducing costs, flat magnet arrays have the additional advantage that they will permit reducing the gaps between rotor and magnets, as indicated in FIG. 11. While thereby the potential cooling channels that existed with Halbach arrangements are closed, the wall width of the current tube may be increased by about one quarter, and the small gaps that are formed between flat magnets and cylindrical current tube surfaces will trap and evenly distribute lubricant. Further, for effective cooling, channels 40 in the current tube wall may be used, as indicated in FIGS. 11, 13A and 13B.

Figure 13A:
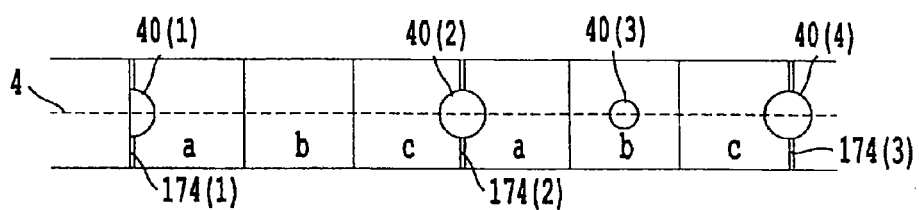
FIG. 13A: Cross section of S-ribbons showing possible locations for cooling channels with the channels completely enclosed in ribbons.
Figure 13B:
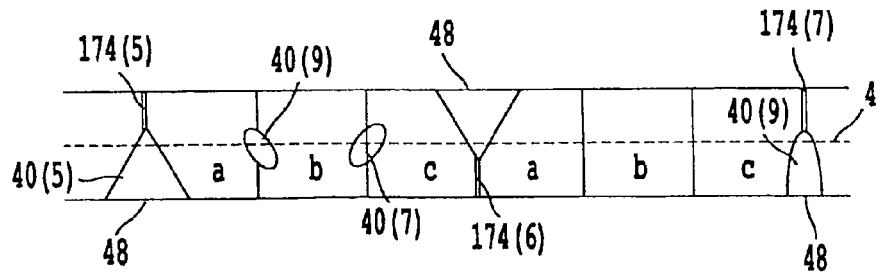
FIG. 13B: Cross section of S-ribbons showing cooling channels completely enclosed and channels impressed from ribbon surface.

The specifics of FIG. 11 in regard to size and arrangement of cooling channels 40, relative size of current tube wall width, and magnet dimensions, are widely adjustable, as further elaborated in FIGS. 13A and 13B. And similarly adjustable are the specifics of FIG. 9. For example, where and how the inner magnet tube (5) is connected to axle (10) e.g. by part 29 as in FIG. 9, is freely adaptable to individual design decisions, provided only that axle 10 and inner magnet tube are forced to rotate together. In fact, since on account of their mutual magnetic attraction magnet tubes 5 and 6 will rotate together, it may be magnet tube 6 rather than 5 that is rigidly fastened to axle 10, or indeed the machine axis may be held stably in relation to the surroundings by any other suitable means. In fact it is not necessary that there be an axle at all. For example, outer magnet tube 6 could be supported by a base plate fitted with bearings that keep the magnet tube axis in fixed position and that permit magnet tube 6 to freely rotate as indicated by part 28 in FIG. 1B and FIG. 12. Whether this is accomplished with or without axle 10, the position of current tube 2 will be fixed in the gap between the two magnet tubes that rotate together on account of the mutual magnet attraction among the magnet pairs in them, while current tube 2 is prevented from rotating at a minimum by cables to power source and cooling connections. Thus in FIG. 9 supports 29 and 181 are indicated by way of example, only, and may or may not even exist.

In line with the above considerations, a fairly snug fit between current tube and the magnets in magnet tubes 5 and 6 on both sides, as in FIG. 11, will be helpful. Even so, as outlined in the legend to FIG. 11, gaps of about 0.06% of D ought to be left on either side of the current tube, and similarly 0.5 mm gaps between magnets, in order to prevent stresses on account of differential thermal expansion. Along with the already indicated latitude in the choice of size, shape and positioning of cooling tubes 40, there is a similar latitude in choosing the positioning of the connection of channels 40 to the inflow feeding tube (41) and outflow draining tube (42) as well as the positioning and shape of these and of the coolant inlet (51) and outlet (52). All these are in suggested but non-binding locations in FIG. 9. In preferred embodiments, the connection between cooling channels 40 and inflow and outflow tubes (41 and 42) will be made through the current tube wall where it will be permitted to extend slightly beyond the magnet tubes and before meeting the rim.

Closer inspection of the installation of cooling tubes 40 as outlined above reveals some difficulties. Different morphologies for incorporating cooling channels into or between triple S-ribbons are indicated in FIGS. 13A and 13B. One of these is making matched indents near the centerline of individual S-cables that on fitting the S-cables together provide cooling channels. Those indents will not serve a useful purpose in the rims (3) outside of the current tube body, which comprise the 180° turns of the triple S-ribbons. Thus those indentations will have to be shaped over closely the right lengths of S-ribbons, and either be omitted or closed off from fluid flow beyond lines XX XX in FIG. 8. Further, access to channels 40 near the current tube body limits (at lines X X) will need to be made to and from inlet and outlet tubes, 41 and 42, and these must be leak-proof. With up to one hundred and more triple S-ribbons per current tube wall (namely $N_Z = \pi D/L_{m/}$, equations 4) this could be a significant technical challenge, especially for small magnet thicknesses, e.g. K<~0.2. These same considerations apply to all cooling channels 40 that are wholly confined within the current tube wall (see FIGS. 13A and 13B).

The alternative would be to let current channel walls be exposed to one or both cylindrical current tube surfaces, as in the lower part of FIGS. 13A and 13B. These have considerable advantages but the nature and installation of barriers 48 will need careful evaluation.

Multiphase Power Other than Three-Phase (n=3) and Optimized Magnet Arrangements

The above explanations and illustrations have concentrated on three-phase power, i.e. triple S-ribbons (173) because, at this point, this is expected to be the most frequent application of MP-T II machines. However, this focus does not imply an exclusion of MP-T II machines from n phases other than n=3. In fact, the same constructions as described can be made with any arbitrary number of phases n>3 by simply dividing the S-bands into n>3 sections instead of n=3. The corresponding phases may appropriately be labeled a, b, c, d, e, f and g, for a 7-phase current, for example. However, for n<3, the S-ribbon width may be preferably reduced. Specifically, for an AC (i.e. single phase) MP-T II machine, the S-ribbon width may be reduced to $(\frac{2}{3})L_{m/}$, and perhaps similarly for n=2 phase current. These are provisional statements, though, and for these cases a detailed analysis directed towards optimization would be highly advisable. Specifically, manufacture of the S-ribbon would probably be complicated by making the cables for single phases overly wide, and these may be preferably subdivides even though electrically connected in parallel. Also the overall width of the S-ribbons relative to the magnet width needs exploration to optimize cost and weight per unit of power.

The above considerations on different numbers of phases, as indeed all of the considerations herein, are critically affected by the magnet arrangements. The above concentration on Case 3A reflects the fact that right now this appears to yield the highest power densities among all cases in Table II. However, it would be a very peculiar coincidence if Case 3A happened to be the best achievable. Also still uncertain is the highest achievable current density. Efforts to expand the necessary finite elements analysis to close these gaps are in progress.

Cooling Efficiency Through Cooling Water Flow in Cooling Channels

The ohmic waste heat $\mathcal{L} W_M$, of an MP machine of power $W_M$ and relative loss $\mathcal{L}$ is generated by current density j passing through area $\pi D/2T$ over zone length L, and thus equals $$\mathcal{L} W_M = d\mathbf{Q}\mathcal{L}/dt = \frac{1}{2}\pi DLT\rho j^2 \text{[watt]}. \tag{11Q}$$

Assume that this waste heat shall be removed by cooling water flowing through cooling channels of combined area $\frac{1}{4}\pi DT$ at speed $v_c$ having specific heat c=1 cal/cc° C.=4.2 ws/cc° C. and being heated through an inflow/outflow temperature difference of $\Delta\theta_C$, i.e.

$$dQ_C/dt = \frac{1}{4}\pi DT \times v_C \times c \times \Delta\theta_C = d\mathbf{Q}\mathcal{L}/dt = \frac{1}{2}\pi DLT\rho j^2 \tag{12Q}$$

It follows that $$v_C \times c \times \Delta\theta_C = 2L\rho j^2 \tag{13Q}$$

or numerically, with c=4.2×10⁶ [ws/° Cm³] and $\rho \approx 2.0 \times 10^{-8}$ Ωm for bundled, compacted Litz wires as before, $$v_C \times \Delta\theta_C = 2L\rho j^2/c = 9.5 \times 10^{-15} Lj^2 \text{[mks]}. \tag{14Q}$$

In order to assess the limits of this kind of cooling, i.e. with water flowing through cooling channels 40 in current tube walls 2, consider the worst likely case of L=5 m, together with a high but reasonable value of $\Delta\theta_C$=50° C. to find the required flow speed of $$v_{C,5m,50o} = 9.5 \times 10^{-16} j^2. \tag{15Qa}$$

Moreover, if this should be limited to the conservative value of $v_C \leq 1$ m/sec $\approx$ 2.2 mph, the largest permissible current density becomes $$j_{max,5m,5o_q} = (1/9.5 \times 10^{-16})^{1/2} \text{[mks]} = 3.2 \times 10^7 \text{ A/m}^2 = 3200 \text{ A/cm}^2. \tag{15Qb}$$

This means that cooling via water flow through cooling channels 40 through current tube walls will be adequate up to 3200 A/cm² (which in fact is well above the value at which the magnet arrangement becomes unstable), for the longest realistic zone length of L=5 m, and will at a coolant flow rate of $v_C$=1 m/sec and arbitrary zone length L, will be adequate for $$(Lj^2)_{max,5oohm/s} \leq 5.2 \times 10^{15} \text{ [A}^2/\text{m}^3] \tag{15Qc}$$

i.e. at L=1 m to j=7200 A/cm². These greatly exaggerated figures show that cooling channels occupying 10% or less of the current tube wall width will be adequate under virtually all circumstances.

Summary

The previous invention of MP-A and MP-T machines with stationary, brushless current tubes is expanded into MP-T II machines that include (i) "flat" magnets in lieu of Halbach arrangements, thereby increasing the power density;
(ii) "triple S-ribbons" with 180° turns or either of two types in "rims" that greatly simplify machine construction;
(iii) improved cooling and lubrication by two alternative methods.

As shown in connection with point (iii) above, MP-machines, motors as well as generators, and in particular MP-T II machines, may be advantageously fitted with "flat" magnets sliding against boundary-lubricated current tubes with clearances of about 0.0006D against the magnets on the outer as well as the inner magnet tube, where D is the current tube diameter. Those clearances are needed to accommodate differential thermal expansion of the current tube versus the magnet tubes, assuming maximum temperature variations of 110° C.

Further in connection with point (iii) above, two new cooling methods are introduced.

1. Flowing cooling fluid through "cuffs" that encircle one or both of the current tube rims, where they extend outside of the magnet tubes, from the outside and/or inside, and/or periodically placed cuffs in close thermal contact with the stationary current tube. This method is very favor-able especially for short machines, with zone lengths of L≤1 ft at ambient temperature, or alternatively requires cooling cuffs at intervals of 1 ft or less along the length of the zones. However, even with regularly spaced cuffs, this method can be very simple and effective. Cryogenic cooling of machines increases the allowable spacing between cooling cuffs by a factor of $\cong(300/\theta)$ where $\theta$ is the absolute temperature of the current tube in Kelvin.

2. Providing axially extended cooling channels (40) in the current tube wall and flowing cooling fluid through these, preferably from an inflow feeding tube that encircles the current tube wall and exiting through a similar outflow draining tube at the other end of the current tube wall. If the combined area of the cooling tubes occupy ¼ of the area between the magnets on the inner and outer magnet tube, if the zone length, L, equals the length of the tubes, if water is the cooling fluid and if it flows at 1 m/sec with a 50° C. temperature difference between outflow and inflow, the maximum permissible current density in the current tube wall would be $j_{max}$=7.2×10⁷/√L [A²/m³], i.e. greatly in excess of the current density at which the poles of magnet tubes 5 and 6 would slip past each other. More realistically, 1% occupancy of the current tube wall by cooling channels should be adequate for virtually all requirements.

Analysis of MP-T II Machines

An analysis of MP-T II machines follows that provides general equations for machine construction and performance as well as a number of numerical examples.

Approximate Parametric Relationships for Three-Phase MP-T II Machine Operation (Assuming "flat" magnets, without gaps between magnets, provisionally of Case #A design)

$A_Z = (\frac{1}{3})L_m/T = (\frac{1}{3})K^2 L_{m/o} T_o$ cross section of current flow per phase, B=Effective magnetic flux normal to current, $C_M$=Materials Cost of machine=$40×$m_m$+$10×($m_M$−$m_m$), D=Diameter at current path midline, $d \cong 8000$ kg/m³=Mechanical density of machine materials (assumed the same for all), $F_1$=Lorentz force per turn, $H_m = KH_{mo}$=Thickness of permanent magnets, I=Current through individual turn=$Ja_Z$, $i_M$=2i=Machine current (assuming two phases pass through B in a zone at any one time), j=Current density, K=Scaling factor for magnet assembly dimensions, L=Length of current tube, $L_b = KL_{bo}$=Radial thickness of flux return material, $L_{m'} = KL_{m/o}$ = Zone width, i.e. width of permanent magnets in circumferential direction, $\mathcal{L}$ = Relative Ohmic loss = $V_{\Omega 1}/V_1$, $M_M = W_M/2\pi v$ = Machine torque, $N_T$ = Number of layers, $N_U$ = Number of essentially independent units into which machine is divided, $N_Z = \pi D/L_{m'}$ = Number of zones, $R_1$ = Ohmic resistance per zone, $v_r = \pi D v = (\pi/60)D\omega_{rpm}$ = Relative velocity between current and permanent magnets, $V_M = N_Z V_1$ = Machine voltage, $V_1$ = Induced voltage per zone, $V_{\Omega 1}$ = Ohmic voltage in current path per zone, $t.\square = \omega_{rpm}/60$ = Rotation rate in Hertz, $\rho \approx 2 \times 10^{-8}$ $\Omega$m = Electrical resistivity in current path, $\omega_{rpm} = 60v$ = Rotation rate in rpm.

Key Equations for MP-T II, Three-Phase Machines (compare Table, [mks] units throughout with watt, Amp and Volt; too many significant figures are retained to avoid accumulation of rounding errors)

Construction Parameters ($N_T = N_u = 1$; with Case 3A, i.e. $H_m = KH_{mo} = K$ 0.0125 m, $L_{m'} = 6H_m$, $L_b = H_m$, $T = 2H_m$, $B = 0.58$t, only two of three phases flow in field B at any one moment; $d = 8000$ kg/m$^3$, $\rho = 2 \times 10^{-8}$ $\Omega$m)

Current Path Area per Phase: $A_Z = (\frac{1}{3})TL_{m'} = 4H_m^2 = 4K^2H_{mo}^2 = 6.25 \times 10^{-4}K^2$ [m$^2$]  (1)

Current per phase: $I$

Current Density: $j = i/A_Z = i/6.25 \times 10^{-6}K^2 = 1600K^{-2}I$ [A/m$^2$]  (2)

Effective Machine Current or of Independent Section: $i_M = 2i = 2JA_Z = 1.25 \times 10^{-3}K^2j$  (3)

(assuming that two of three phases flow in peak magnetic flux density, B, at any one moment)

Number of zones: $N_Z = \pi D/L_{m'} = \pi D/6H_m = \pi D/6KH_{mo} = 41.9$ D/K [mks]  (4)

Lorentz Force per Zone: $F_1 = i_M BL = 1.25 \times 10^{-3}K^2 BLj$  (5)

Total Lorentz Force $F = N_Z F_1 = 3.04 \times 10^{-2}KDLj$  (6)

Torque: $M_M = (D/2)N_Z F_1 = 0.0152KD^2Lj$  (7)

Machine Power: $W_M = (2\pi\omega_{rpm}/60)M_M = 1.59 \times 10^{-3}KD^2Lj\omega_{rpm}$  (8)

Voltage per Zone $V_1 = v_r BL = (\pi/60)D\omega_{rpm}BL = 3.04 \times 10^{-2}N_T D\omega_{rpm}L$  (9)

Machine Voltage: $V_M = N_Z V_1 = 1.27 D^2 L\omega_{rpm}/K$  (10)

Ohmic Voltage Loss per Zone*: $V_{1\Omega} = \rho Lj$  (11)

Relative Ohmic Loss: $\mathcal{L} = V_{1\Omega}/V_1 = (\rho j)/(3.04 \times 10^{-2}D\omega_{rpm}) = 6.59 \times 10^{-7}j/D\omega_{rpm}$  (12)

Ohmic Machine Resistance: $R_M = N_Z \rho L/A_Z = 1.34 \times 10^{-3}DL/K^3$  (13)

Mass of Magnet Material: $m_m = 2\pi dDLKH_{mo} = 628KDL$ [kg]  (14)

Flux Return Material Mass: $m_b = 2\pi dDLKL_{bo} = 628KDL = m_m$ [kg]  (15)

Current Path Mass: $m_{Cu} \approx 2\pi dDLKT_o \approx 628KDL = m_m$ [kg]  (16)

Cost of Magnet Material: $C_m = \$40 \times m_m = \$25,100KDL$  (17)

Machine Mass: $m_M = 1.3(m_m + m_b + m_{Cu}) = 1.3 \times 3m_m = 3.9m_m = 2450KDL$ [kg]  (18)

Machine Material Cost: $C_M = \$40 \times m_m + \$10 \times (m_M - m) = \$10 \times (4+2.9)m_m = 1.77 C_m = \$44,400KDL$  (19)

Power Density: $W_M/m_M = 6.45 \times 10^{-7}Dj\omega_{rpm}$ or $m_M/W_M = 1.55 \times 10^6/Dj\omega_{rpm}$  (20)

Cost per Unit of Power: $C_M/W_M = \$2.79 \times 10^7/Dj\omega_{rpm}$  (21)

TABLE I

Forecast Performance of MP-T II Machines with $N_T = N_U = 1$, all in [mks]
(Summary of eqs. 1 to 21 above)

| MP-T II (Case 3A, B = 0.58 tesla) | MP-T (Case 1A, B = 0.56 tesla) |
|---|---|
| $H_{mo} = L_{bo} = 1.25$ cm, $L_{m/o} = 7.5$ cm $T_o = 2.5$ cm | $H_{mo} = L_{bo} = 1.25$ cm, $L_{m/o} = 2.5$ cm $T_o = 2.5$ cm |
| $A_Z = (\frac{1}{3})K^2 L_{m/o} T_o = 6.25 \times 10^{-4}K^2$ [m$^2$] | $A_Z = (\frac{1}{3})K^2 L_{m/o} T_o = 2.08 \times 10^{-4}K^2$ [m$^2$] |
| $v_r = \pi D v = (\pi/60)D\omega_{rpm} = 0.0524 D\omega_{rpm}$ | $v_r = \pi D v = (\pi/60)D\omega_{rpm}$ [m/s] |
| $V_1 = v_r BL = (\pi/60)BDL\omega_{rpm} = 0.0304DL\omega_{rpm}$ [V] | $V_1 = v_r BL = (\pi/60)BDL\omega_{rpm} = 0.0293DL\omega_{rpm}$ [V] |
| $N_Z = \pi D/L_{m1} = 41.9$ D/K | $N_Z = \pi D/L_{m'} = 126$ D/K |
| $V_M = N_Z V_1 = (41.9 D/K)V_1 = 1.27 D^2 L\omega_{rpm}/K$ [mks] | $V_M = N_Z V_1 = (126 DK) V_1 = 3.69 D^2 L\omega_{rpm}/K$ [mks] |
| $i_1 = j A_Z = 6.25 \times 10^{-4}K^2 j$ [mks] | $i_1 = j A_Z = 2.08 \times 10^{-4}K^2 j$ [mks] |
| $i_M = 2 i_1$ | $i_M = 2 i_1$ |
| $R_1 = \rho L/A_Z = 3.2 \times 10^{-5} L/K^2$ [mks] | $R_1 = \rho L/A_Z = 9.61 \times 10^{-5}L/K^2$ [mks] |
| $\rho = 2 \times 10^{-8}\Omega$m | $\rho = 2 \times 10^{-8}\Omega$m |
| $R_M = N_Z R_1 = 1.34 \times 10^{-3}DL/K^3$ [mks] | $R_M = N_Z R_1 = 1.21 \times 10^{-2} DL/K^3$ [mks] |
| $V_{1\Omega} = i_1 R_1 = \rho L j = 2 \times 10^{-8}Lj$ | $V_{1\Omega} = i_1 R_1 = \rho L j = 2 \times 10^{-8}Lj$ |
| $\mathcal{L} = V_{1\Omega}/V_1 = 6.59 \times 10^{-7}j/D\omega_{rpm}$ | $\mathcal{L} = V_{1\Omega}/V_1 = 6.82 \times 10^{-7}j/D\omega_{rpm}$ |
| $M_M = (D/2)N_Z i_1 LB = 0.0152KD^2 L j$ | $M_M = 2 (D/2) N_Z i_1 LB = 0.0146KD^2 L j$ |
| (assume 2 of 3 phases work together, which | (assume 2 of 3 phases work together, but |

TABLE I-continued

Forecast Performance of MP-T II Machines with $N_T = N_U = 1$, all in [mks]
(Summary of eqs. 1 to 21 above)

| MP-T II (Case 3A, B = 0.58 tesla) $H_{mo} = L_{bo} = 1.25$ cm, $L_{m/o} = 7.5$ cm $T_o = 2.5$ cm | MP-T (Case 1A, B = 0.56 tesla) $H_{mo} = L_{bo} = 1.25$ cm, $L_{m/o} = 2.5$ cm $T_o = 2.5$ cm |
|---|---|
| is probably sound) | this is probably an over-estimate) |
| $W_M = M_M 2\pi\omega_{rpm}/60 = 0.00159 KD^2 Lj\omega_{rpm}$ | $W_M = M_M \pi\omega_{rpm}/30 = 0.00153 KD^2 Lj\omega_{rpm}$ |
| $m_m = d2\pi DLKH_{mo} \cong 628$ KDL [mks] | $m_m = d2\pi DLKH_{mo} \cong 628$ KDL [mks] |
|  | $d = 8000$ kg/m$^3$ |
| $m_M \cong 3.9\, m_m \cong 2450$ KDL [mks] | $m_M \cong 2.6 d\pi DL(KH_{mo} + KL_{bo} + KT_o/2) =$ |
|  | $1.3\, \pi m_m[1 + (L_{bo} + T_o/2)/H_{mo}] \cong 3.9 m_m \cong 2450$ KDL |
| $W_M/m_m = 2.43 \times 10^{-6} Dj\omega_{rpm}$ [mks] | $W_M/m_m = 1.83 \times 10^{-6} Dj\omega_{rpm}$ |
| $W_M/m_M = 6.47 \times 10^{-7} Dj\omega_{rpm}$ [mks] | $W_M/m_M = 4.69 \times 10^{-7} Dj\omega_{rpm}$ [mks] |
| $C_m \cong \$40 \times m_m = \$25,100$ KDL [\$mks] | $C_m \cong \$40 \times m_m = \$25,100$ KDL [\$mks] |
| $C_M = 1.77 C_m = \$44,400$ KDL [\$mks] | $C_M \cong 1.72\, C_m \cong \$43,340$ KDL [\$mks] |
| $C_M/W_M \cong \$2.79 \times 10^7/Dj\, \omega_{rpm}$ [\$mks] | $C_M/W_M \cong \$3.77 \times 10^7/Dj\omega_{rpm}$ [\$mks] |

NUMERICAL EXAMPLES

Comments on Current Density, Machine Loss and "Floating Loss"

As seen from the above equations and Table I, typically in conceptional and presumably actual machines, the loss $\mathcal{L}$ plays a central role in that it is proportional to the current density, j (see eq. 12) and so are the torque, the machine power and the power density (see eqs. 7, 8 and 20). Therefore if loss is set at some predetermined level, the typical effect is to thereby indirectly set the level of cost and power density, especially at low rotation rates, unless the current density is determined independently.

In many, if not most prior types of electrical machines, the rate of heat evolution, i.e. loss $\mathcal{L}$, limits machine design, namely on account of cooling problems. These arise from the fact that internal machine temperature is limited, at least to the level at which permanent magnets and/or machine component materials deteriorate. In previous machines, conductors tended to be at least partly in the form of coils, i.e. wires embedded in some insulating and thus poorly heat conducting "potting" material that slowed down the rate of waste heath removal or, conversely, raised the internal machine temperature. On account of their coil-free construction and available effective cooling systems, MP-T II machines are essentially free of this impediment, and waste heat removal is rarely if ever a limitation for them. The above reason for limiting $\mathcal{L}$ does therefore not, or only quite rarely, apply to MP-T II machines.

In MP-T II machines based on Case 3A magnet morphology, instead, the current density is limited to $\sim 1.2 \times 10^7$ A/m$^2$=1200 A/cm$^2$. At still higher current densities, the proportionality between current density and torque (eq. 7) increasingly breaks down and eventually the correlated magnet poles in inner and outer magnet tube will slip past each other. Finite element analysis to determine the optimum magnet morphology and the dependence of $M_M$ on j (eq. 7) at high current densities is still very incomplete. At this point, $j=1.2 \times 10^7$ A/m$^2$ is believed to be safe for both Case 1A and Case 3A, and in conceptual machine designs, a provisional maximum current density of $j_{max}=1.2 \times 10^7$ A/m$^2$ is adopted. It any even, careful analyses with a view of optimizing MP-T II machines are highly recommended.

Cooling channels occupy a fraction of the current-carrying, torque-producing area $A_Z$. However, the discussed limit of $j_{max}$ pertains to the total current flow between inner and outer magnet tubes (labels 5 and 6) which is not affected by making space for cooling channels, e.g. as in FIGS. 11, 13A and 13B. Even so, cooling channels on average reduce the current carrying part of $A_Z$, thereby raising the local current density and the heat evolution. Specifically, if cooling channels occupy one n$^{th}$ of the current tube wall area, they raise the heat evolution by n/(n−1), specifically for the extreme case of 1/n=¾ the heat evolution increase is by the factor 4/3=1.333. This effect of cooling channels to increase heat evolution is further considered in the following numerical examples. However, the effect of using the maximum current density, i.e. $j_{max}=j=1.2\times 10^7$ A/m$^2$, in lieu of some pre-selected loss, L, is examined under the title "floating loss."

Example a

An MP-T I Motor of 100 hp Power and 200 rpm Speed $M_M$=3580 Nm

Machine with K=0.25, $\mathcal{L}$=4%

At $W_M=7.5\times 10^4$ watt and $\omega_{rpm}=200$ rev/min, the torque is $M_M=60\times 7.5\times 10^4/2\pi 200=3580$ Nm, i.e. from eq. 7

$$M_M=0.0152 KD^2 Lj=3850 \tag{7a}$$

for $$KD^2 Lj=2.52\times 10^5 \text{ [mks]}. \tag{23a1}$$

The first decision will be the choice of K, which will be made as small as possible in order to lighten the machine and save cost of permanent magnet material but without unduly complicating practicalities of machine construction. Provisionally we may choose K=0.25 to let the magnets be $H_m$=K 1.25 cm=0.31 cm thick and the zones be $6H_m$=1.88 cm wide in circumferential direction. With this choice of K=0.25 we obtain $$D^2 Lj=2.52\times 10^5/K=1.01\times 10^6 \text{ [mks]}. \tag{24a1}$$

The next choice then is of the current density j. One will wish to make this as large as possible in order to obtain a small value of D$^2$L and thus low magnet and machine weight, but one is constrained by the fact that the loss, $\mathcal{L}$ is proportional to j in accordance with eq. 12, i.e. with $\omega_{rpm}=200$ rpm, find $$\mathcal{L}=V_{1\Omega}/V_1=6.59\times 10^{-7} j/D\omega_{rpm}=3.30\times 10^{-9} j/D \tag{25a1}$$

Choosing $\mathcal{L}$=4.0% we obtain, $$\mathcal{L}=3.30\times 10^{-9} j/D=0.04 \tag{26a1}$$

for $$j=1.21\times 10^7 D. \tag{27a}$$

For D=0.55 m (in order not to lower j too much nor end up with an unnecessarily large motor) we then find from 27a $$j=6.67\times10^6 \,[A/m^2]=667 \,A/cm^2 \qquad (28a1)$$

and from eq. (24a1)

$$L=1.01\times10^6/D^2j=0.50 m. \qquad (29a)$$

With these dimensions, the required magnetic mass is from eq. 14

$$m_m\cong628KDL=43.2 \text{ kg} \qquad (14a1)$$

costing $C_m\cong\$1,730$ and, following eqs. 18 and 19, the machine mass will be $$m_M=2450KDL=168 \text{ kg}=370 \text{ lbs} \qquad (18a1)$$

costing $$C_M=\$44,400KDL=\$3050 \qquad (19a1)$$

for a weight power density of $$m_M/W_M=1.55\times10^6/Dj\omega_{rpm}=3.5 \text{ lb/hp} \qquad (20a1)$$

and specific materials cost $$C_M/W_M=\$30.5/hp. \qquad (21a1)$$

Following eq. 10 the voltage (disregarding $\mathcal{L}$) is, with K=0.25, D=0.55 m and L=0.50 m:

$$V_M=1.27D^2L\omega_{rpm}/K\cong154 \text{ V} \qquad (10a1)$$

for a machine current of $$i_M\cong W_M/V_M=490 \text{ A}. \qquad (30a1)$$

Same Machine but Equiaxed, i.e. L=D, with "Floating Loss" and K=0.25

Torque equation (23a) yields with $j=j_{max}=1.2\times10^7$ A/m², K=0.25 and L=D $$D^2L=2.52\times10^5/Kj_{max}=0.084 \,[m^3]=D^3=(0.438 \text{ m})^3. \qquad (23a2)$$

This results in a loss of $$\mathcal{L}=V_{1\Omega}/V_1=6.59\times10^{-7}j/D\omega_{rpm}=9.03\% \qquad (25a2)$$

and magnet mass $$m_m\cong628KDL=30.1 \text{ kg} \qquad (14a2)$$

costing $C_m\cong\$1,205$. Then, following eqs. 18 and 19, the machine mass will be $$m_M=2450KDL=118 \text{ kg}=260 \text{ lbs} \qquad (18a2)$$

at cost $$C_M=\$44,400KDL=\$2,130 \qquad (19a2)$$

for a weight power density of $$m_M/W_M=1.55\times10^6/Dj\omega_{rpm}=2.4 \text{ lb/hp} \qquad (20a2)$$

and specific materials cost $$C_M/W_M=\$21.3/hp. \qquad (21a2)$$

Following eq. 10 the voltage, including $\mathcal{L}=0.0903$ is, with K=0.25 and D=L=0.438 m $$V_{Mcorr}=(1.27D^2L\omega_{rpm}/K)(1-\mathcal{L})\cong95 \text{ V} \qquad (10a2)$$

for a machine current of $$i_M\cong W_M/V_M=790 \text{ A}. \qquad (30a2)$$

Same Machine with $\mathcal{L}=4\%$ but K=1

All of the above parameters are very reasonable. Larger K values will decrease the manufacturing costs by decreasing the number of magnet pieces to be installed but will, at same diameter, leave the materials cost unchanged and decrease the machine voltage. By way of example consider K=1, for $H_M=1.25$ cm and $L_m$=7.5 cm. In that case $$D^2Lj=3850/(0.0152K)=2.53\times10^5 \,[mks]. \qquad (24a2)$$

Then with the same 4% loss, diameter of D=0.55 m and current density of $6.67\times10^6$ A/m², find $$L=2.53\times10^5/(0.55^2\times6.67\times10^6 \text{ A})=0.125 \text{ m} \qquad (24a3)$$

with the same magnet mass $$m_M=628KDL=43.2 \text{ kg} \qquad (14a3)$$

but voltage $V_M=1.27D^2L\omega_{rpm}/K\cong9.6$ V $\qquad (10a3)$ and current $$i_M\cong W_M/V_M=7810 \text{ A} \qquad (30a3)$$

a patently absurd design. Thus, primarily, choice of K is a tool for achieving a desirable voltage.

Same Machine with K=0.25 and $\mathcal{L}=4\%$ but different α

By contrast to the parameter K, the aspect ratio, α=L/D, significantly influences the machine cost. Decreasing α, reduces the magnet mass and thus the cost as seen in the following example: Beginning with eq. 27a and K=0.25 as before, choose D=0.8 m to find $$j=1.21\times10^7D=9.68\times10^6 \text{ A/m}^2 \qquad (28a4)$$

and from (24a1) with K=0.25, D=0.8 m and $j=9.68\times10^6$ A/m² find $$L=2.52\times10^5/(D^2Kj)=0.163 \,[m] \qquad (24a4)$$

for $$m_m=628KDL=20.4 \text{ kg} \qquad (14a4)$$

and $$m_M=2450KDL=79.9 \text{ kg}=175 \text{ lbs} \qquad (18a4)$$

for $$m_M/W_M=1.75 \text{ hp/lb or } W_M/m_M=0.94 \text{ Kw/kg}. \qquad (20a4)$$

while $$V_M=1.27D^2L\omega_{rpm}/K\cong106 \text{ V}$$

with $$i_M\cong W_M/V_M=708 \text{ A} \qquad (30a4)$$

and $$C_M/W_M=\$2.79\times10^7/Dj\omega_{rpm}=\$14.4/hp. \qquad (21a4)$$

Thus a considerable cost decrease is bought at the expense of a remarkably squat machine (α=L/D=0.163/0.80=0.20) as well as a significantly lowered machine voltage.

Conclusions

As seen, the range of choices is vast. The choice of $\mathcal{L}$=4 is overly conservative and the "floating" loss case with $\mathcal{L}$ yields great machine cost savings, namely by \$21.3/hp/\$30.5/hp i.e. almost one third. Meanwhile, the monetary effect of raising the loss from 4% to 9% is as of 96%/91%=1.055, i.e. of 5.5%, and this even at a less favorable aspect ratio, namely α=1 instead of α=0.9. Accordingly, considerable thought should be given to the level of loss so as to optimize the systems, whether it be of motors or generators.

Example b

MP-T II Motor of 6100 hp Power and 120 rpm Speed $M_M$=3.62×10$^5$ Nm Preamble Beyond the function of the parameter K to permit adjustments of machine voltage, choice of K impacts machine manufacture. This is so because the difficulty of handling individual magnets rises with their size, namely on account of the magnetic forces among them that are roughly proportional to $K^3$, whereas the effort of installing magnets escalates with decreasing K-values as both the number of magnets as well as the precision with which they need to be placed rises roughly as $1/K^2$. The importance of these considerations rises with machine size. Therefore, in this case of a large machine and in which voltage imposes no restriction, K=0.4 is chosen as a perceived good compromise between the two named problems, i.e. of large numbers and hard to handle large magnet sizes. Experience will teach what the best options may be. Meanwhile, the possibility of subdividing machines into independent units that may be connected in-series or in-parallel, greatly simplifies adjustments of voltages to a desired level even at same K.

Machine with K=0.4, $\mathcal{L}$=4% and α=½

At $W_M$=6100 hp=4.55×10$^3$ Kw and $\omega_{rpm}$=120 rpm, it is $M_M$=3.62×10$^5$ Nm. We find. from eq. 7

$$M_M=0.0152KD^2Lj=3.62\times10^5 \text{ [mks]} \quad (7b)$$

i.e.

$$KD^2Lj=2.38\times10^7 \text{ [mks]}. \quad (23b1)$$

With K=0.40 (based on the considerations above) we obtain $$D^2Lj=2.38\times10^7/K=5.95\times10^7 \text{ [mks]}. \quad (24b1)$$

Again choosing $\mathcal{L}$=4% (even though realizing that substantial cost and weight may be saved with a higher loss, e.g. $\mathcal{L}$=8% as already suggested above), we find from eq. (12) with $\omega_{rpm}$=120 rpm, $$\mathcal{L}=6.59\times10^{-7}j/D\omega_{rpm}=5.49\times10^{-9}j/D=0.040 \quad (25b1)$$

for $$j=7.28\times10^6 D \quad (27b1)$$

and by inserting 27b into eq. (24b1) find $$D^3L 7.28\times10^6=5.95\times10^7 \text{ [mks], i.e. } D^3L=8.17 \text{ m}^4. \quad (31b1)$$

At this point it is useful to explore the effect of aspect ratio α=L/D to rewrite eq. (31b1) into a $D^4$=8.17 [m$^4$] i.e. $\alpha^{1/4}D=8.17^{1/4}=1.69$ m yielding $$D=1.69/\alpha^{1/4}[m] \text{ and } L=\alpha^{3/4}1.69 \text{ [m]}. \quad (31b2)$$

Consequently, with K=0.4 obtain $$m_m=628KDL=251(1.69/\alpha^{1/4})(\alpha^{3/4}1.69)=\alpha^{1/2}718 \text{ kg}. \quad (14b1)$$

Numerically, $m_m$ decreases fairly rapidly with decreasing values of α but with a gradually decreasing impact on $m_m$, while increasingly squat machines become intuitively awkward. We therefore choose α=0.5 as a reasonable compromise. With this we obtain from (31b2)

$$D=2.01m \text{ and } L=1.00m \quad (31b3)$$

for which equation (14b1) yields $$m_m=628KDL=628\times K\alpha^{1/2}1.69^2=508 \text{ kg} \quad (14b2)$$

at a cost of $$C_m=\$20,300 \quad (17b1)$$

while $$m_M=3.9m_M=1980 \text{ kg}=4360 \text{ lbs} \quad (18b1)$$

at cost $$C_M=1.77C_m=\$35,900 \quad (19b1)$$

$$\text{or } C_M/W_M=\$5.9/\text{hp}. \quad (21b1)$$

The resulting power density is $$m_M/W_M=0.71 \text{ lbs/hp or } W_M/m_M=2.30 \text{ Kw/kg}. \quad (20b1)$$

Further, the voltage is found at $$V_M=1.27D^2L\omega_{rpm}/K\cong1,540 \text{ V} \quad (10b1)$$

with $i_M \cong 4550$ Kw/1540 V=2950 A $\quad (30b1)$

Same Machine but Equiaxed, i.e. L=D, with "Floating Loss" and K=0.4

Torque equation (7b) yields with $j=j_{max}=1.2\times10^7$ A/m$^2$, K=0.25 and L=D $$M_M=0.0152KD^2Lj=3.62\times10^5 \text{ [mks]} \quad (7b)$$

$$D^2L=2.38\times10^7/Kj_{max}=4.96 \text{ [m}^3\text{]}=D^3=(1.70m)^3 \quad (23b2)$$

resulting in loss $$\mathcal{L}=V_{1\Omega}/V_1=6.59\times10^{-7}j/D\omega_{rpm}=3.9\% \quad (25b2)$$

and magnet mass $$m_m\cong628KDL=726 \text{ kg} \quad (14b2)$$

costing $C_m\cong\$29,000$. Then, following eqs. 18 and 19, the machine mass will be $$m_M=2450KDL=2830 \text{ kg}=6230 \text{ lbs} \quad (18b2)$$

at cost $$C_M=\$44,400KDL=\$51,300 \quad (19b2)$$

for a weight power density of $$m_M/W_M=1.55\times10^6/Dj\omega_{rpm}=1.0 \text{ lb/hp} \quad (20a2)$$

and specific materials cost $$C_M/W_M=\$8.4/\text{hp}. \quad (21a2)$$

Following eq. 10 the voltage, including $\mathcal{L}=\cong4\%$ is, with K=0.4 and D=L=1.7m, is $$V_{Mcorr}=(1.27D^2L\omega_{rpm}/K)(1-\mathcal{L})\cong1950 \text{ V} \quad (10a2)$$

for a machine current of $$i_M \cong W_M/V_M=2330 \text{ A}. \quad (30b2)$$

Conclusion

This example shows that there is an upper limit to $\mathcal{L}$ that is derived from stability of the magnet arrangement and that is not necessarily large even by conservative standards.

Same Machine with K=0.4, $\mathcal{L}$=4% but $\alpha$=1

All of above values are very reasonable, especially since, if desired, the machine can be split into, say, two in-series parts with about 750V each, or conversely into parallel parts with one half of the current, i.e. 1500 A, or in general into n parts with $V_M/n$ voltage $i_M$ current or with $V_M$ voltage and $i_M$ current. In fact, the above results are quite favorable on account of the squat design. For an equiaxed machine of same K=0.4, current density and loss the values change as follows: Eq. (31b1) yields $$D=L=1.69\text{m} \quad (31b4)$$

for a magnet material mass $$m_M=628KDL=628\times K\times1.69^2=717\text{ kg} \quad (14b3)$$

machine mass $$m_M=3.9m_M=2800\text{ kg}=6155\text{ lbs} \quad (18b1)$$

and power density $$m_M/W_M=1.01\text{ lbs/hp or } W_M/m_M=1.62\text{ Kw/kg}. \quad (21b1)$$

The machine voltage becomes $$V_M=1.27D^2L\omega_{rpm}/K\cong1,840\text{ V} \quad (10b2)$$

with current $$i_M\cong W_M/V_M=2470\text{ A}. \quad (30b2)$$

The specific materials cost is $$C_M/W_M=\$50,760/6100\text{ hp}=\$8.3\text{/hp}. \quad (21b2)$$

Elongated Machine ($\alpha$=3) for Podded Ship Drive with K=0.3 & Floating Loss

From the rewritten torque equation (7) i.e.

$$KD^2Lj=3.62\times10^5Nm/0.0152=2.38\times10^7\text{ [mks]} \quad (24b2)$$

obtain with K=0.32 (for a not too low voltage), with L=$\alpha$D=3D and $j_{max}$=1.2×107 A/m², $$D^2L=\alpha D^3=2.38\times10^7/Kj_{max}=6.19\text{ [m}^3\text{]}=(\alpha^{1/3}1.84\text{ [m]})^3 \quad (23b3)$$

i.e.

$$D=1.84/\alpha^{2/3}=0.88\text{ m and }L=1.84\alpha^{1/3}=2.65\text{ m} \quad (31b4)$$

resulting in a loss of $$\mathcal{L}=6.59\times10^{-7}j_{max}/D\omega_{rpm}=0.075=7.5\%. \quad (25b3)$$

With these values, i.e. K=0.32, D=0.88m and L=2.65m, the magnet mass becomes $$m_m=628KDL=469\text{ kg} \quad (14b4)$$

at a cost of $$C_m=\$18,750 \quad (17b3)$$

while $$m_M=3.9m_m=1,830\text{ kg}=4,020\text{ lbs} \quad (18b3)$$

at cost $$C_M=1.77C_m=\$33,200 \quad (19b3)$$

or $$C_M/W_M=\$5.4\text{/hp}. \quad (21b3)$$

The resulting power density is $$m_M/W_M=0.66\text{ lbs/hp or }W_M/m_M=2.50\text{ Kw/kg} \quad (20b3)$$

and the voltage and current are $$V_M=1.27D^2L\omega_{rpm}/K\cong980\text{ V} \quad (10b3)$$

$$i_M\cong W_M/V_M=4550\text{ A}. \quad (30b3)$$

If desired, the voltage may be increased by lowering K, since this raises the machine dimensions even while at set machine dimensions, $V_M$ is inversely proportional to K. However, as already discussed, reduction of K will increase construction cost of the machine. Thus, again, careful modeling is advisable before deciding on any particular design. In any event, specific materials cost is remarkable low and power density is high, in spite of the strongly elongated design of the present example.

General Comments on Small MP-T II Motors or Generators

Since MP-T machines require electronic controls and will only coincidentally operate on 60 Hz current, it seems unlikely that large numbers of small MP-T machines will ever be used casually for mundane tasks, e.g. for operating car widows or powering vacuum cleaners and sewing machines. Even so, on account of their achievable high power densities, compact MP-T II machines, whether motors and/or generators, may have a future in high-tech applications, e.g. for drones, unmanned underwater vehicles or generators in space. At a lower size limit, D may be as small as, say, 10 cm or less and the rotation rate could be at least as high as 15,000 rpm. According to eq. 8, at current density j=×10⁷, length of, say, L=0.3m and K=0.2, this would permit a surrealistic power above 100 Kw. Evidently, the limitation here would be cooling. Anyway, given a high-tech need, one should try to adapt MP-T machines to it.

TABLE III

Summary of Numerical Examples

| $W_M$ | $\omega_{rpm}$ | K | $\mathcal{L}$ | D | L | $V_M$ | $i_m$ | $m_M$ | $C_M$ | $m_M/W_M$ | $C_M/W_M$ |
|---|---|---|---|---|---|---|---|---|---|---|---|
| 100 hp | 200 rpm | 0.25 | 4.0% | 0.55 m | 0.50 m | 154 V | 490 A | 168 kg | $ 3,050 | 3.5 lb/hp | $30.5/hp |
| " | " | 0.25 | 9.03% | 0.438 m | 0.438 m | 95 V | 790 A | 118 kg | $ 2,130 | 2.4 lb/hp | $21.3/hp |
| " | " | 1.0 | 4.0% | 0.55 m | 0.125 m | 9.6 V!! | 7810 A! | | | | |
| " | " | 0.25 | 4.0% | 0.80 m | 0.163 m | 106 V | 708 A | 79.9 kg | $ 1,440 | 1.76 lb/hp | $14.4/hp |
| 6100 hp | 120 rpm | 0.40 | 4.0% | 2.01 m | 1.00 m | 1540 V | 2950 A | 1980 kg | $35,900 | 0.71 lb/hp | $5.9/hp |
| " | " | 0.40 | 3.9% | 1.70 m | 1.70 m | 1950 V | 2330 A | 2830 kg | $51,300 | 1.0 lb/hp | $8.4/hp |
| " | " | 0.40 | 4.0% | 1.69 m | 1.69 m | 1840 V | 2740 A | 2800 kg | $50,720 | 1.01 lb/hp | $8.3/hp |
| " | " | 0.32 | 7.5% | 0.88 m | 2.65 m | 980 V | 4550 A | 1830 kg | $33,200 | 0.66 lb/hp | $5.4/hp |

TABLE II

Characteristics of Halbach and Flat Magnet Arrangements

| 1 X | 2 $L_{mOn}$ [cm] | 3 $L_{gOx}$ [cm] | 4 $T_{Ox}=$ [cm] | 5 $H_{mOn}$ [cm] | 6 $L_{bOn}$ [cm] | 6 $B_x$ [tesla] | 8 $\beta_n=$ $B_n/B_H$ | 9 $\lambda_n=$ $L_{mOn}/L_{mOH}$ | 10 $\delta_n=$ $T_{On}/T_{OH}$ | 11 $\mu_n=$ $H_{mOn}/H_{mOH}$ | 12 $W_{Mn}/m_{mn}$ $\alpha\beta_n^2\delta_n/\mu_n$ | 13 $\kappa_{\mu n}V_M$ $\alpha\beta_n/\lambda_n$ | 14 $3\mu_n/8=$ $_{min}\kappa_{\mu n}$ | 15 $(V_{Mn}/V_{MH})_{mn}$ $\alpha\beta_n/_{min}\kappa_{\mu n}\lambda_n$ |
|---|---|---|---|---|---|---|---|---|---|---|---|---|---|---|
| H | 2.15 | | 1.55 | 2.85 | 0 | 0.80 | 1 | 1 | 1 | 1 | 1 | 1 | | |
| 1B | 2.0 | 2.5 | 1.88 | 0.75 | 1.25 | 0.38 | 0.475 | 0.93 | 1.21 | 0.263 | 1.04 | 0.511 | 0.099 | 5.18 |
| 2B | 2.0 | 2.5 | 1.88 | 1.00 | 1.25 | 0.43 | 0.544 | 0.93 | 1.21 | 0.351 | 1.02 | 0.585 | 0.132 | 4.43 |
| 3B | 2.0 | 2.5 | 1.88 | 1.25 | 1.25 | 0.46 | 0.575 | 0.93 | 1.21 | 0.439 | 0.911 | 0.618 | 0.165 | 3.75 |
| 4B | 2.0 | 2.5 | 1.88 | 1.75 | 1.25 | 0.51 | 0.636 | 0.93 | 1.21 | 0.614 | 0.797 | 0.684 | 0.230 | 2.97 |
| 1A | 2.5 | 2.5 | 1.88 | 1.25 | 1.25 | 0.56 | 0.700 | 1.16 | 1.21 | 0.439 | 0.945 | 0.603 | 0.165 | 3.65 |
| 2A | 5.0 | 2.5 | 1.88 | 1.25 | 1.25 | 0.63 | 0.788 | 2.33 | 1.21 | 0.439 | 1.71 | 0.338 | 0.165 | 2.05 |
| 3A | 7.5 | 2.5 | 1.88 | 1.25 | 1.25 | 0.66 | 0.825 | 3.49 | 1.21 | 0.439 | 2.27 | 0.236 | 0.165 | 1.43 |
| 4A | 2.5 | 2.5 | 1.88 | 2.50 | 2.50 | 0.62 | 0.775 | 1.16 | 1.21 | 0.877 | 0.828 | 0.668 | 0.329 | 2.03 |
| 5A | 5.0 | 2.5 | 1.88 | 2.50 | 2.50 | 0.85 | 1.06 | 2.33 | 1.21 | 0.877 | 1.55 | 0.455 | 0.329 | 1.38 |
| 6A | 7.5 | 2.5 | 1.88 | 2.50 | 2.50 | 0.86 | 1.075 | 3.49 | 1.21 | 0.877 | 1.59 | 0.308 | 0.329 | 0.936 |
| 7A | 2.5 | 2.5 | 1.88 | 3.75 | 3.75 | 0.64 | 0.80 | 1.16 | 1.21 | 1.32 | 0.587 | 0.690 | 0.495 | 1.39 |
| 8A | 5.0 | 2.5 | 1.88 | 3.75 | 3.75 | 0.91 | 1.13 | 2.33 | 1.21 | 1.32 | 1.17 | 0.485 | 0.495 | 0.98 |
| 5B | 7.5 | 2.5 | 1.88 | 3.75 | 0.75 | 0.78 | 0.98 | 3.49 | 1.21 | 1.32 | 0.87 | 0.281 | 0.495 | 0.568 |
| 6B | 7.5 | 2.5 | 1.88 | 3.75 | 1.25 | 0.85 | 1.06 | 3.49 | 1.21 | 1.32 | 1.03 | 0.303 | 0.495 | 0.612 |
| 7B | 7.5 | 2.5 | 1.88 | 3.75 | 2.50 | 0.95 | 1.19 | 3.49 | 1.21 | 1.32 | 1.30 | 0.341 | 0.495 | 0.689 |
| 9A | 7.5 | 2.5 | 1.88 | 3.75 | 3.75 | 0.99 | 1.24 | 3.49 | 1.21 | 1.32 | 1.41 | 0.355 | 0.495 | 0.717 |

Cases $X_A$ from E. Maslen report of Sep. 27, 2005, Cases $X_B$ from E. Maslen report of May 24, 2006

X = Case; $L_m$ = zone width; $H_m$ = magnet tube wall width; T = current tube wall width = $^3/_4$ gap width, $L_g$ $B_n$ for 45MGOE Now we turn to a fuller illustration of the prior art and aspects of the invention in the drawings.

Figure 1A:
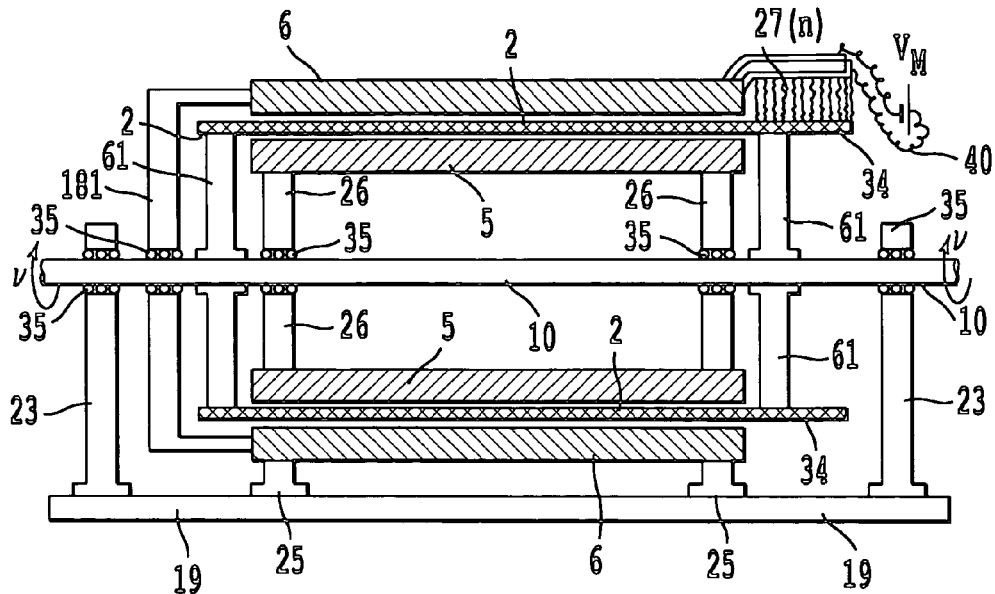
FIG. 1A PRIOR ART: A Schematic cross section of MP machine with rotating current tube 2.
Figure 1B:
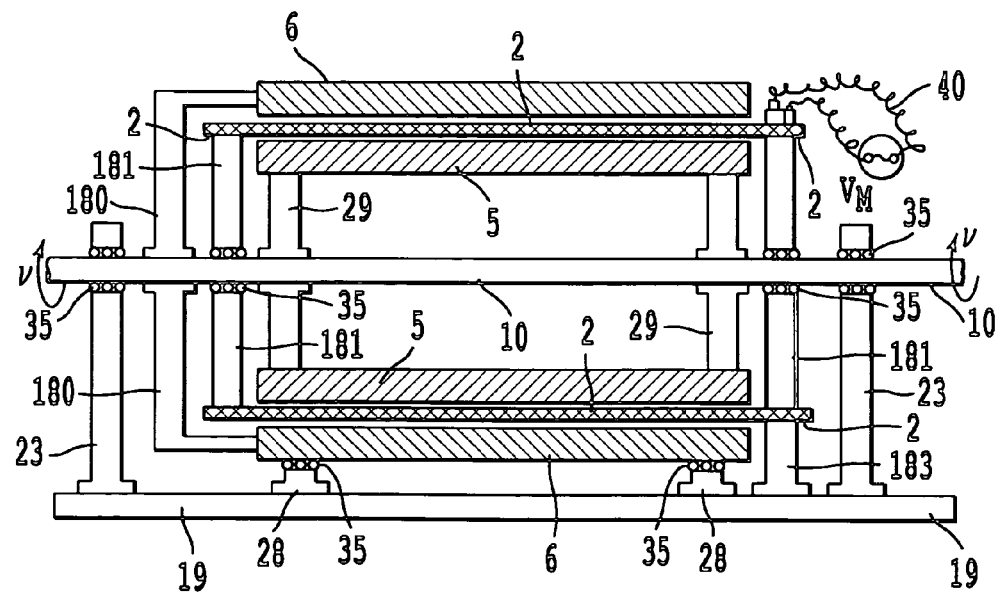
FIG. 1B PRIOR ART: A Schematic cross section of an MP-A or MP-T machine with stationary current tube.

FIG. 1A PRIOR ART shows a schematic cross section of an MP machine wherein current tube 2 rotates with the machine axle 10, while the outer (6) and inner magnet tube (5) are stationary. In this case a machine with current-channeling current tube in the motor mode is assumed that is powered by a DC power supply. An MP-A or MP-T motor would comprise a current tube fitted with one or more S-ribbons and would be powered with AC or three-phase FIG. 1B PRIOR ART: As FIG. 1A but for the case of an MP-A or MP-T machine, wherein magnet tubes 5 and 6 rotate with axle 10 while current tube 2 remains stationary on account of its mechanical anchoring to the base plate 19 via part 183.

Figure 2A:
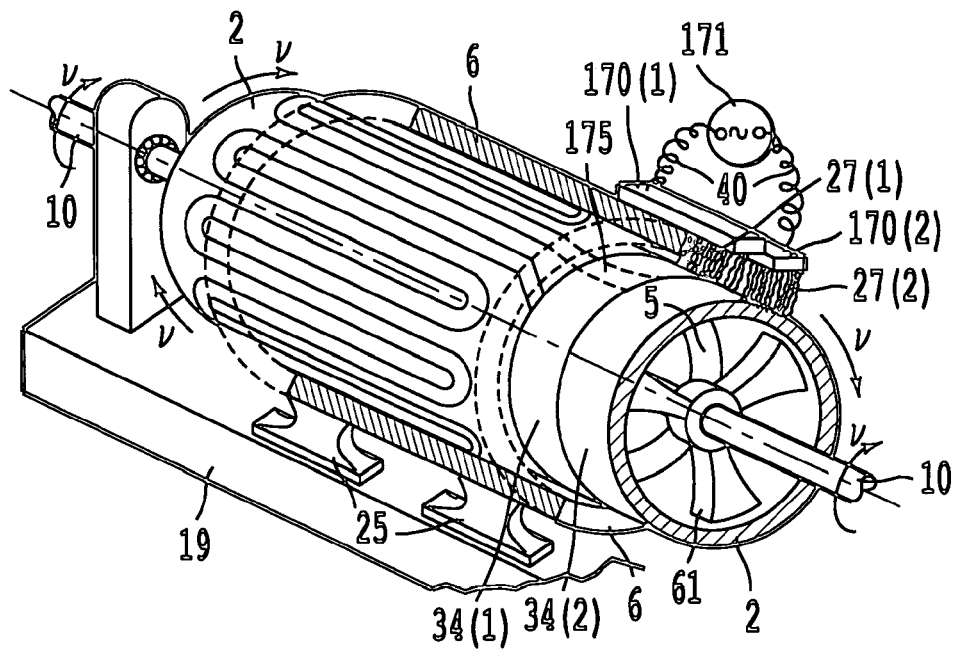
FIG. 2A PRIOR ART: Perspective view of a machine with the basic construction of FIG. 1A.

FIG. 2A PRIOR ART is a perspective view with partially cut-out outer magnet tube 6 of a machine with the basic construction of FIG. 1A, but for the case of an insulating current tube 2 with embedded serpentine-shaped conductor (S-ribbon).

Figure 2B:
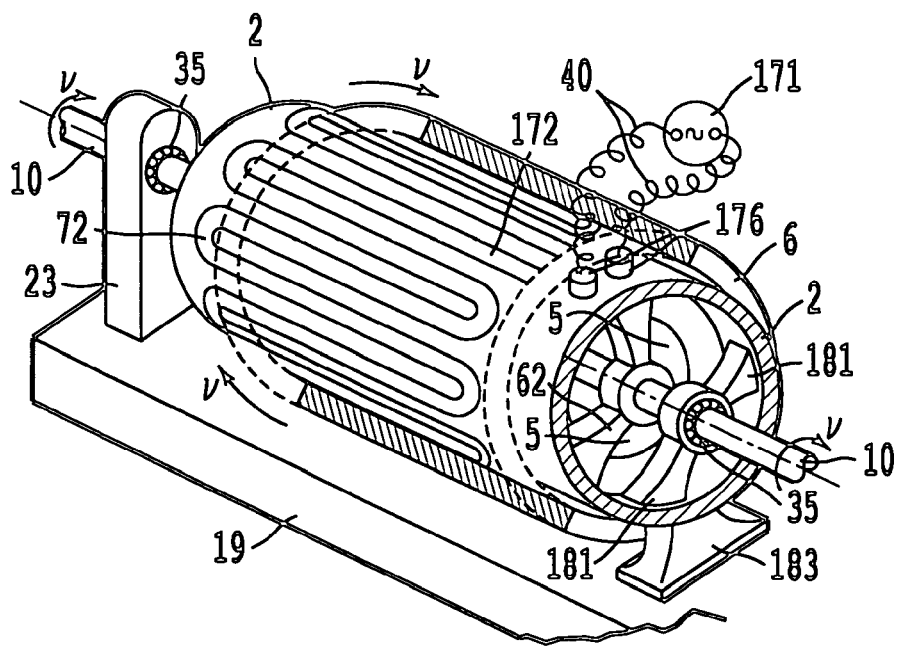
FIG. 2B PRIOR ART: Perspective view of a machine with the geometry of FIG. 1B.

FIG. 2B PRIOR ART: As FIG. 2A but for the geometry of FIG. 1B. Note that with stationary current tube 2, the electrical connection to the outside (i.e. power supply or consumer 171) can be made directly through mutually insulated terminals 176 on an extension of current tube 2, so that no slip rings are required. Thereby the machine is shortened, its power density increased and cost reduced. This design also makes multiple S-ribbons in one current tube possible which permits simultaneous use of different machine functions and power sources.

FIG. 3A PRIOR ART is a plan view of S-ribbons in the current tube of an MP-T machine; In this view, magnets are located between lines XX and XX, namely above and below the plane of the drawing.

FIG. 3B PRIOR ART reveals a cross sectional view of S-ribbons in the current tube body of an MP-T machine before compaction.

FIG. 3C PRIOR ART shows a cross sectional view of S-ribbons in the current tube body of an MP-T machine after compaction.

Figure 4:
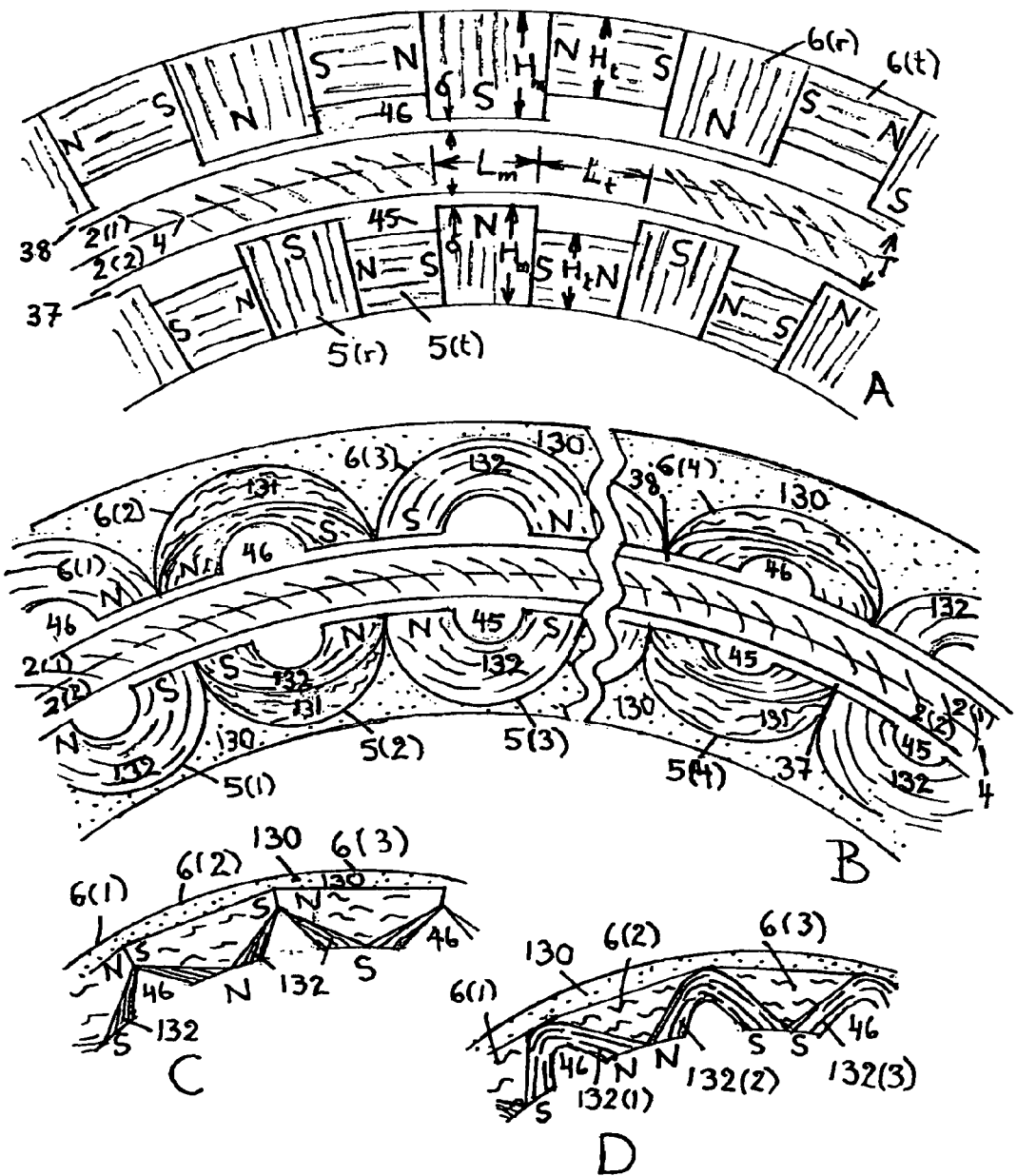
FIG. 4 PRIOR ART: A selection of possible different magnet arrangements in any MP machine, including MP-A and MP-T machines in accordance with the present invention.
Figure 5:
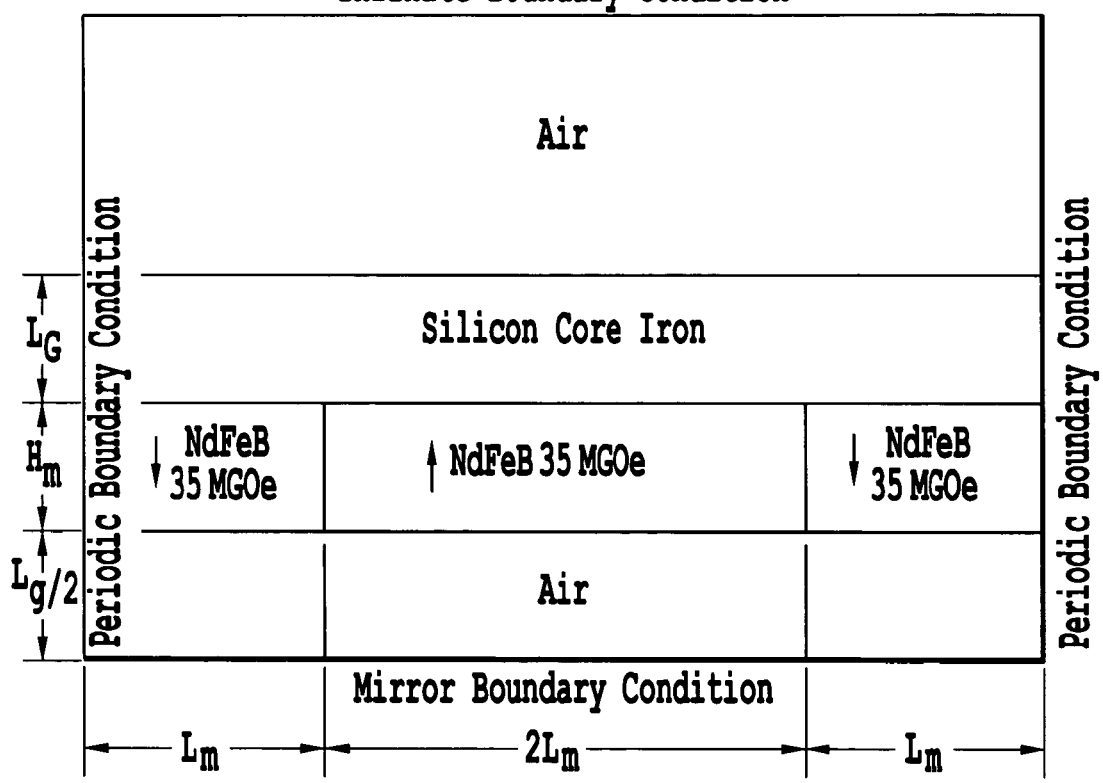
FIG. 5: Basic geometry that was used in finite element analysis of magnetic flux distributions.

FIG. 4 PRIOR ART shows a selection of possible different magnet arrangements in any MP machine, including MP-A and MP-T machines in accordance with the present invention FIG. 5: Basic geometry used in finite element analysis of magnetic flux distributions for various cases by Eric Maslen of UVA. The critical dimensions for MP-T II machines are the magnet width $L_m$, that in these arrangements is identical to the periodicity distance $2L_m$, the magnet thickness $H_m$, the thickness of the flux return material $L_b$, and the gap width between opposing magnets $L_g$ that herein is assumed to be identical with the thickness of the current tube wall. However, typically MP-T II machines may employ NdFeB 45 MGOe material that produces $(45/35)^{1/2}=1.13$ larger flux densities than NdFeB 35 MGOe material in E. Maslen's modeling.

FIG. 6 illustrates the morphology of magnets and field lines (in the geometry of FIG. 5, top) and magnetic flux density at mid-line of current tube 2 (bottom) for Case 1A according to Eric Maslen, UVA, September 2005. As already indicated in the legend to FIG. 5 above, for MP-T machines with NdFeB 45 MGOe material, the flux densities in the lower part of the figure should be multiplied with the factor of $(45/35)^{1/2}=1.13$, for B=0.56 tesla instead of 0.49 tesla. in this Case 1A.

Sizes are $H_m$=$KH_{mo}$=K1.25 cm; $L_b$=$H_m$; $L_m$=$KL_{mo}$=K2.5 cm, and $L_g$=$KL_{go}$=K2.5 cm FIG. 7 shows the morphology of magnets and field lines (in the geometry of FIG. 5, top) and magnetic flux density at mid-line of current tube 2 (bottom) for Case 3A. Again, when using 45 MGOe magnets, the average magnetic flux density is expected to be 0.58 tesla instead of 0.51 tesla. Sizes are $H_m$=$KH_{mo}$=K1.25 cm; $L_b$=$H_m$; $L_m$=$KL_{mo}$=K7.5 cm, and $L_g$=$KL_{go}$=K2.5 cm. Among the configurations modeled so far (see Table II), this Case 3A appears to be the most favorable but logically cannot be the optimum. Also the fact that its peak value of B≅0.51 tesla falls below that of B≅0.52 for Case 1A, when it should be higher, indicates that the iron silicon backing of thickness $L_b$=$H_m$ is too thin, so that and improved values in terms of machine power density can probably be achieved by adjusting $L_b$. Further, the assumption that B rises in proportion with $(45/35)^{1/2}$ when substituting 45 MGOe material needs top be checked in view of these considerations. Pertinent finite element modeling is in progress.

Figure 3:
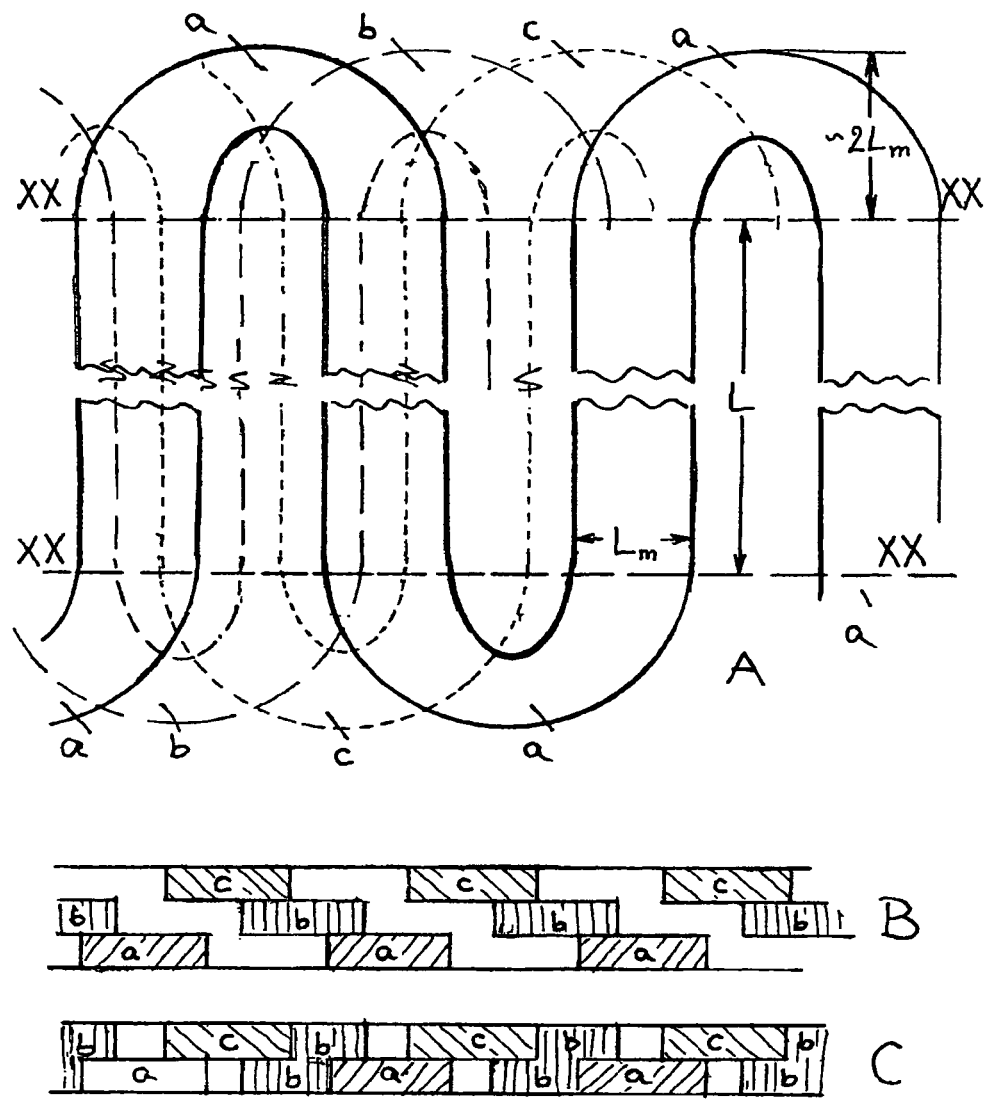
FIG. 3A PRIOR ART: Plan view of S-ribbons in the current tube of an MP-T machine.
FIG. 3B PRIOR ART: Cross sectional view of S-ribbons in the current tube body of an MP-T machine before compaction.
FIG. 3C PRIOR ART: Cross sectional view of S-ribbons in the current tube body of an MP-T machine after compaction.

FIGS. 8A and 8B are the equivalent of FIG. 3, clarifying current tube 2 construction of MP-T II machines from triple S-ribbons (173) comprising three parallel current paths for phases (a), (b) and (c), preferably made of mildly twisted compacted Litz wire cables. FIG. 8A is a plan view of the current tube wall between inner and outer magnet tubes (5 and 6), that terminate at lines XX . . . XX. The current tube wall extends beyond lines XX into rims where 180° turns ribbons 173 are located,—here shown made by folding. FIG. 8B shows a partial cross section through current tube 2 wall and magnet tubes 5 and 6. The alternating direction of current flow in tandem with changing polarity of the magnets is indicated by circles with central dots or crosses, respectively. At any time, near maximum current flows in two phases (here (a) and (b)) while the third phase (here c) has minimal current because it straddles the borders between adjacent magnets where the flux density B changes direction.

FIG. 8C shows the construction of 180° turn of triple S-ribbon 173 via three folds as labeled.

FIG. 8D shows the construction of 180° turn of triple S-ribbon 173 via a mildly spiraling "wrap" about a slim rod or tube that may at the same time (as in this figure) serve as a "cuff" cooling channel (40).

FIG. 9 illustrates the lengthwise cut through a brushless MP machine with stationary current tube, including provision for two possible alternative cooling arrangements. These are, (1) cooling by means of a "cuff" (47) that encircles at least one rim, is in good thermal contact with it (in this case rim 3(2)), and through which a coolant is passed. This is a favored method for short machines, whether motors or generators, but at ambient temperatures is limited to machines of L=1 ft or less. By the use of strongly refrigerated coolants, this method may be extended to much greater lengths; in the extreme case, i.e. liquid helium cooling, to L~10 ft. According to the present invention, at ambient temperature, for machines at and above L=1 ft, a preferred cooling method uses cooling channels (40) within the current tube wall (2) and supplied with coolant via inflow and outflow tubes (41 and 42). Without loss of previously estimated performance, cooling channels 40 may occupy up to about 25% of the current tube wall. Channels 40 may be preferably connected to tubes 41 and 42 by passing through current tube wall 2 just outside of the zones, i.e. outside of the magnet tubes and before the joints between current tube wall and rims 3(1) or 3(2). This is at or close to the positions of optional magnetic shields (90), if used. Magnetic shields of annular shape are made of soft iron and cover the ends of the magnet tubes, thereby screening at least partly stray magnetic end-fields extending outside of the magnet tubes.

FIG. 10 is a graph model for the derivation of eqs. 1Q to 4Q.

FIG. 11 is the cross section through an MP-T machine with flat magnets in the outer (6) and inner (5) magnet tube, and with cooling channels (40) in the current tube wall (2). Optionally, liquid or gaseous coolant, e.g. air, or water, or an organic liquid, pre-cooled or not as may be desired, is passed through cooling channels (40) between feeding and draining tubes 41 and 42 indicated in FIG. 9. In preferred embodiments, in favor of lower cost and/or improved lubrication, magnets are flat i.e. of uniform thickness, as indicated in this figure. The arrangement of cooling channels 40 as well as their shapes and sizes is optional. If the machine current is left unchanged, and properly arranged cooling channels 40 occupy fraction $f_c$ of current tube wall area, forecast machine performance may be unaffected even though the loss, $\mathcal{L}$ rises by the factor $1/(1-f_c)$. However, thermal expansion gaps must be left between current tube and magnet tubes on account of differential thermal expansion/contraction, i.e. of the current tube (probably of copper), the magnet material and the current return iron backing. At a potential temperature variation range of $\Delta\theta=110°$ C., given that the linear thermal expansion of metals is about 2.3% between absolute zero and their melting temperature, $\theta_M$, that for copper it is $\theta_M=1350K$ and it is one third higher for iron flux return material, the percentage dimension difference between the current and magnet tubes will be ~2.3%(110K/1350K)/3=~0.06%. Hence, to be on the safe side, gaps of D×0.06%, or 0.6 mm per 1 m diameter will be needed on either side of the current tube wall. The adhesive by which the magnets are fastened to the magnet tubes is expected to accommodate the expansion differential between magnets and flux return. However, expansion joint gaps of ~$L_m/100$ should be left between neighboring magnets, i.e. typically less than ½ mm.

FIG. 12 shows the lengthwise cross section of part of an MP-T II machine with cooling through periodic cooling "cuffs" (47) that encircle the current tube (2). The current tube rim (3) comprises 180° turns of the S-ribbons, in this case of the mildly spiraling "wrap" type shown in FIG. 8D. Optionally, those wrap type 180° turns encircle a cooling channel (40) that here functions in the role of a cooling cuff. The figure shows two mildly different constructions, namely on the right with the inner magnet tube (5) continuous while the outer magnet tube (6) is periodically interrupted by cooling cuffs. According to the derivation of eqs. 1Q to 4Q, for ambient temperature operation these ought to be spaced ~1 ft or less apart. In the left part of the above figure, not only the outer magnet tube (6) but also the inner magnet tube (5) is periodically interrupted, namely in tandem with the interruptions of the outer magnet tube. A continuous inner magnet tube as at right requires at least one driver, i.e. rigid mechanical connection 29 to axle 10, as also seen in FIG. 9. However, with interruptions as in the left part of the figure, every section requires at least one such connection, labeled 29(n-3) and 29(n-2) in the Figure. The various sections of the outer magnet tube, labeled 6(n), 6(n-1) etc., will rotate together with the inner magnet tube on account of the mutual magnetic attraction between the magnet pole pairs. Supports 28 with bearings 35 on base plate 19 shown in the figure, are expected to directly help smooth the rotation of the outer magnet tube sections (6n), and indirectly the smooth running of the whole machine. The potential benefit of mechanically separating inner magnet tube 5 into sections as at left could be savings in magnet material. However, also with a continuous inner magnet tube as at right, the magnets are preferably omitted at the gaps of outer tube 6 in order to save cost, since, locally, without the opposing outer magnets, the inner magnets cannot fully maintain the magnetic flux density in the gaps where the cooling cuffs are applied. The decision on whether or not to segment also the inner magnet tube will then have to be based on other than magnet cost considerations, e.g. mechanical stability, manufacturing cost, etc.

FIGS. 13A and 13B show examples of possible arrangements of cooling channels (40) in the wall of a current tube (2) whose midline is indicated with label 4. FIG. 13A illustrates cases in which the cooling channels are wholly confined in the current tube wall, while FIG. 13B shows wholly confined cooling channels (40(6) and 40(7)) as well as cooling channels bordering the surface of 2 and thus adjoining the sliding interfaces 37 and/or 38, namely 40(5), 40(8) and 40(9). The considerable advantages of cooling channels bordering the sliding interfaces include (i) ease of manufacture (e.g. impressing them into the current tube 2 surface(s) at any favorable stage of the manufacturing process), and (ii) the ready opportunity to confine the position and length of cooling channels 40 to the sections between, and connecting them to, cooling fluid inlet and outlet tubes such as shown as (41) and (42) in FIG. 9. Their disadvantages include the potential difficulty of supplying a cooling channel wall (48) that will be electrically insulating, leak-proof, and durable during long-time sliding against either of the magnet tubes and the magnets mounted on them. The above figure aims to show that optionally, different types of channels may be simultaneously used in the same current tube, that the channel cross section may be circular as in the top part of this figure), elliptical 40(6) 40(7) and 40(9) or polygonal 40(5) and 40(8), that they may or may symmetrically oriented to the current tube midplane 40(6) and 40(7), that they may straddle the boundaries between adjacent current paths of phases 40(6) and 40(7) and/or of the boundaries between adjacent triple S-ribbons (174) (40(1), 40(2), 40(4), 40(5), 40(8) and 40(9)), in addition to any other possible permutations such as placing them asymmetrically relative to mid-plane 4 and current tube surfaces.

| LABELS | |
|---|---|
| 2 | current tube |
| 3 | "rim" of 180° turns of S-cables or triple S-ribbons |
| 4 | mid-line of current tube |
| 5 | inner magnet tube |
| 6 | outer magnet tube |
| 10 | axle |
| 19 | machine base plate |
| 23 | mechanical support for axle 10 on machine base plate 19 via low friction bearing 35 |
| 25 | rigid mechanical support of outer magnet tube 6 on base plate 19 to keep 6 centered on axle 10 |
| 26 | mechanical connection centering inner magnet tube 5 on axle 10 via low-friction bearing 35 |
| 27 | electrical brush, 27(1) and 27(2) sliding on slip rings 34(1) and 34(2), respectively |
| 28 | mechanical support of outer magnet tube 6 on base plate 19 via low-friction bearing 35 |
| 29 | rigid mechanical connection between inner magnet tube 5 and axle 10 so as to rotate together |
| 33 | brush holder |
| 34 | slip ring; inner slip ring 34(1), outer slip ring 34(2) |
| 35 | low-friction bearing |
| 37 | cylindrical gap/sliding interface between current tube 20 and inner magnet tube 5 |
| 38 | cylindrical gap/sliding interface between current tube 20 and outer magnet tube 6 |
| 40 | cooling channel (or cable to power source or consumer) |
| 41 | inflow feeding tube for cooling channels 40 |
| 42 | outflow draining tube for cooling channels 40 |
| 45 | possible channel for cooling of inner magnet tube and current tube |
| 46 | possible channel for cooling of outer magnet tube and current tube |
| 47 | cooling cuff for machines of L <1 ft* at ambient temperature, or spaced at 1 ft intervals |
| 48 | electrically insulating, leak-proof cooling channel wall |
| 51 | inlet for coolant into inflow feeding tube 41 |
| 52 | outlet for coolant from outflow draining tube 42 |
| 61 | rigid structural part connecting current tube 2 to axle 10 so as to rotate together |
| 62 | rigid structural part connecting inner magnet tube 5 to axle 10 so as to rotate together |
| 84 | funnel extending from the outer magnet tub |
| 85 | propeller or impeller |
| 86 | structural support for propeller or impeller that permits fluid flow-through |
| 87 | groove in support 86 |
| 90 | magnet shield |
| 130 | non-magnetic material |
| 131 | flux return material |
| 132 | permanent magnet material |
| 171 | electrical power source or consumer |
| 172 | "S-ribbon" or section of S-ribbon for a single phase |
| 173 | "triple S-Ribbon" for three-phases |
| 174 | insulating joint between adjacent turns of a Triple S-Ribbon |
| 176 | electrical terminal for connecting current tube to outside stationary components |
| 180 | rigid mechanical connection between outer magnet tube 6 and axle 10 so as to rotate together |
| 181 | mechanical connection centering current tube 2 on axle 10 via low-friction bearing 35 |
| 183 | rigid mechanical support of current tube 2 on base plate 19 to keep 6 centered on axle 10 |
| 184 | insulating outer surface layer of S-ribbon |
| 190 | insulating barrier, e.g. in current tube rim to electrically insulate successive sections of S-ribbon |

This invention may be embodied in other specific forms without departing from the spirit or essential characteristics disclosed. The foregoing embodiments are therefore to be considered in all respects illustrative rather than limiting of the invention described herein. The scope of the invention disclosed is thus indicated by the appended claims rather than by the foregoing description, and all changes which come within the meaning and range of equivalency of the claims are intended to be embraced herein. Unless clearly stated to the contrary, there is no requirement for any particular described or illustrated activity or element, any particular size, speed, dimension, material, or frequency, or any particular interrelationship of any described elements. Therefore, the descriptions and drawings are to be regarded as illustrative in nature and not restrictive. Any information in any material that has been incorporated herein by reference is only incorporated by reference to the extent that no conflict exists between such information and the statements and drawings set forth herein. In the event of such conflict, including a conflict that will render invalid any claim herein, then any such conflicting information stated to be incorporated by reference is specifically not incorporated by reference herein.

I claim:

1. An electric machine comprising: multiple flat magnetic field sources surrounding at the outside and inside a current tube capable of conducting current; said current tube having a wall of substantially constant thickness; and said magnetic field sources establishing a magnetic flux density in a multiplicity of axially extended, regularly spaced zones in said current tube wall; and said magnetic flux density alternating in radial orientation between neighboring zones; and said current tube wall comprising at least one conductive elongated S-ribbon; said S-ribbon shaped so as to alternatively substantially overlap a multiplicity of adjacent zones and substantially overlap the gaps between said zones when the current tube rotates relative to said magnetic field sources.

2. A machine according to claim 1 wherein the machine operates as an electric motor.

3. A machine according to claim 1 wherein the machine operates as an electric generator.

4. A machine according to claim 1 wherein the machine operates as an electric transformer.

5. An electric machine according to claim 1, wherein said multiple magnetic field sources are flat permanent magnets that are attached to an outer magnet tube and an inner magnet tube such that they pair-wise face each other across the wall of said current tube.

6. A machine according to claim 1 wherein the current tube has a predetermined rotationally symmetrical cylindrical shape wherein lines between correlated points at the two current tube ends may be straight or curved.

7. An electric machine according to claim 5, wherein said outer magnet tube and said inner magnet tube are stationary and said current tube is rotatable.

8. An electric machine according to claim 5, wherein said outer magnet tube and said inner magnet tube are rotatable and said current tube is stationary.

9. An electric machine according to claim 5 wherein all surfaces of said current tube and magnet tubes are protected by means of paint, varnish, lacquer or other protective coating for use of said machine in an aggressive fluid, including for example sea water.

10. A machine according to claim 1 wherein the S-ribbons are folded 180° at both ends of the current tube so that the S-ribbon passes from one zone to the next contiguous zone in the current tube.

11. A machine according to claim 1 wherein at least one S-ribbon is made from at least one wire bundle that has been twisted and compacted.

12. A machine according to claim 1 wherein at least one S-ribbon comprises two or more parallel current paths.

13. A machine according to claim 12 wherein at least one S-ribbon comprises two or more parallel current paths which are folded 180° at both ends of the current tube so that as the S-ribbon passes from one zone to the next contiguous zone, the parallel current paths remain in the same position relative to each other in each zone.

14. A machine according to claim 1 wherein said a rotor comprises multiple parts of S-ribbon sections of solid metal.

15. A machine according to claim 1 wherein the current tube comprises at least one joint between a current tube part comprising S-ribbon parts composed of wires and a rotor part comprising S-ribbon parts made of solid metal.

16. A machine according to claim 1 wherein a multiplicity of S-ribbons is subdivided into sub-units by providing insulating barriers.

17. A machine according to claim 1 wherein the current tube further comprises two or more concentric, mechanically fused but electrically insulated conductive layers.

18. A machine according to claim 1, 2, 3, or 10 wherein said current tube comprises multiple layers of compacted S-ribbons.

19. A machine according to claim 1 wherein the current tube comprises cooling cuffs further comprising cooling tubing, through which cooling fluid is passed, that encircles one or both ends of the current tube and which are in thermal contact with the one or both ends of the current tube.

20. A machine according to claim 1 wherein the current tube comprises cooling channels, through which cooling fluid is passed, embedded in the current tube wall.

21. A machine according to claim 1 wherein the current tube comprises axially extended cooling channels, through which cooling fluid is passed, impressed into the current tube wall.

22. A machine according to claim 19 wherein the cooling fluid is a lubricant.

23. A machine according to claim 19 wherein the cooling fluid is water.

* * * * *